US012699978B2

(12) United States Patent
O'Herlihy et al.

(10) Patent No.: US 12,699,978 B2
(45) Date of Patent: Aug. 4, 2026

(54) OPERATION OF A SELF-CHECK OUT SURFACE AREA OF A RETAIL STORE

(71) Applicant: Everseen Limited, Blackpool (IE)

(72) Inventors: Alan O'Herlihy, Glenville (IE); Ovidiu Parvu, Timisoara (RO); Ana Cristina Todoran, Arad (RO); Dan Alexandru Pescaru, Timisoara (RO)

(73) Assignee: Everseen Limited, Blackpool (IE)

( * ) Notice: Subject to any disclaimer, the term of this patent is extended or adjusted under 35 U.S.C. 154(b) by 460 days.

(21) Appl. No.: 17/897,324

(22) Filed: Aug. 29, 2022

(65) Prior Publication Data

US 2022/0414632 A1 Dec. 29, 2022

Related U.S. Application Data

(63) Continuation-in-part of application No. 16/689,356, filed on Nov. 20, 2019, now abandoned.

(Continued)

(51) Int. Cl.
*G06Q 20/20* (2012.01)
*G06Q 20/18* (2012.01)
(Continued)

(52) U.S. Cl.
CPC ........... *G06Q 20/208* (2013.01); *G06Q 20/18* (2013.01); *G06Q 20/202* (2013.01); *G06V 10/62* (2022.01);
(Continued)

(58) Field of Classification Search
CPC .... G06Q 20/208; G06Q 20/18; G06Q 20/202; G06Q 20/4016; G06V 10/62;
(Continued)

(56) References Cited

U.S. PATENT DOCUMENTS 6,047,262 A 4/2000 Lutz
8,448,859 B2 5/2013 Goncalves et al.
(Continued)

FOREIGN PATENT DOCUMENTS

CN 104267810 B * 9/2017 ............. G06F 3/011
JP 2014-029589 A 2/2014

OTHER PUBLICATIONS

Wilson (Convenience Store Operator Goes Digital with Surveillance, Chain Store Age, https://www.chainstoreage.com/operations/convenience-store-operator-goes-digital-with-surveillance, Dec. 3, 2018) (Year: 2018).

*Primary Examiner* — Peter Ludwig
*Assistant Examiner* — Matthew S Weronski
(74) *Attorney, Agent, or Firm* — Conley Rose, P.C.

(57) ABSTRACT

The present subject matter relates to a system and method of operating one or more self-checkout (SCO) terminals of a SCO environment. The system comprises one or more video sensors configured to capture a plurality of video frames. The video frames are processed by a processing unit to detect a primary subject of interest and a second subject of interest post detection of the primary subject of interest. Further, change in location and time of appearance of the primary subject of interest and the secondary subject of interest is determined, which generates a motion trigger. Based on the motion trigger, a transaction data is received which is compared with the detected secondary subject of interest. A non-scan event alert is generated based on a mismatch in the comparison of the transaction data and the detected one or more secondary subject of interest.

20 Claims, 9 Drawing Sheets

<div style="display:flex;">

<div>

Related U.S. Application Data

(60) Provisional application No. 62/803,695, filed on Feb. 11, 2019.

(51) Int. Cl.
| | |
|---|---|
| *G06V 10/62* | (2022.01) |
| *G06V 10/764* | (2022.01) |
| *G06V 10/77* | (2022.01) |
| *G06V 40/10* | (2022.01) |

(52) U.S. Cl.
CPC ............ *G06V 10/764* (2022.01); *G06V 10/77* (2022.01); *G06V 40/10* (2022.01)

(58) Field of Classification Search
CPC ...... G06V 10/764; G06V 10/77; G06V 40/10; G06V 20/44; G06V 20/52; G06V 20/49; G07G 1/0063
See application file for complete search history.

</div>

<div>

(56) References Cited

U.S. PATENT DOCUMENTS

| | | | |
|---|---|---|---|
| 10,282,720 | B1 | 5/2019 | Buibas et al. |
| 2012/0197741 | A1* | 8/2012 | Carlegren ............ G07G 1/0036 |
| | | | 705/16 |
| 2012/0320199 | A1 | 12/2012 | Kundu et al. |
| 2012/0321146 | A1 | 12/2012 | Kundu et al. |
| 2017/0213427 | A1 | 7/2017 | Hamada |
| 2018/0096567 | A1 | 4/2018 | Farrow et al. |
| 2018/0373928 | A1 | 12/2018 | Glaser et al. |
| 2020/0020112 | A1* | 1/2020 | Buibas .............. G01G 19/4144 |
| 2021/0019725 | A1 | 1/2021 | Xiao et al. |
| 2021/0319420 | A1* | 10/2021 | Yu .......................... G06V 20/52 |
| 2022/0222644 | A1* | 7/2022 | Okamura .............. H04N 7/188 |
| 2023/0034455 | A1* | 2/2023 | Suzuki ................. G06V 20/52 |
| 2023/0316254 | A1* | 10/2023 | Maan ................. G06Q 30/015 |
| | | | 705/18 |

* cited by examiner

</div>

</div>

| Output Label | Processing Module Unit | Output |
|---|---|---|
| $O_1$ | SCO Supervisor Locator | {"SCO LOCK", "VOID"} |
| $O_2$ | Queue Analyser | {"SCO LOCK", "VOID"} |
| $O_3$ | Product Movement Analyser | {"SCO LOCK", "VOID"} |
| $O_4$ | SCO Group Analysis | {"SCO LOCK", "VOID"} |
| $O_5$ | Non-Scan Sequence Analyser | {"SCO LOCK", "VOID"} |
| $O_6$ | Cart Fullness Analyser | {"EMPTY", "PARTLY FULL", "FULL", "FULL-BULK LOADED", "FULL-LARGE ITEM"} |

FIG. 8

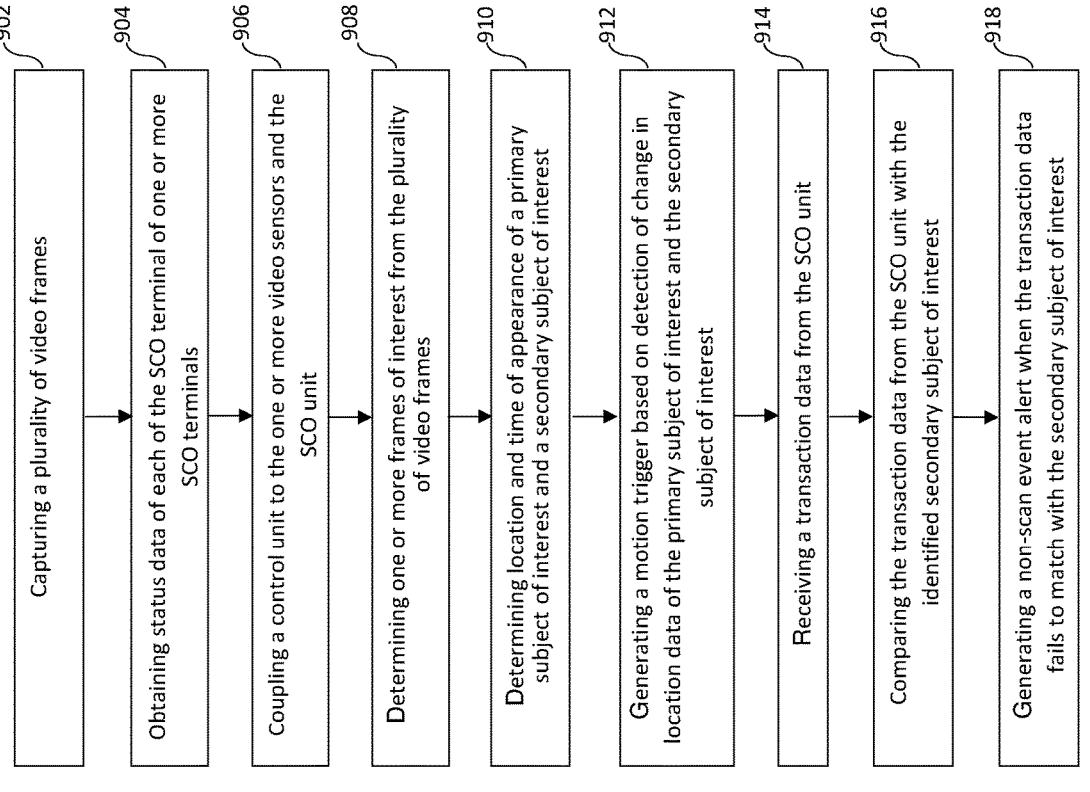

Capturing a plurality of video frames — 902

Obtaining status data of each of the SCO terminal of one or more SCO terminals — 904

Coupling a control unit to the one or more video sensors and the SCO unit — 906

Determining one or more frames of interest from the plurality of video frames — 908

Determining location and time of appearance of a primary subject of interest and a secondary subject of interest — 910

Generating a motion trigger based on detection of change in location data of the primary subject of interest and the secondary subject of interest — 912

Receiving a transaction data from the SCO unit — 914

Comparing the transaction data from the SCO unit with the identified secondary subject of interest — 916

Generating a non-scan event alert when the transaction data fails to match with the secondary subject of interest — 918

OPERATION OF A SELF-CHECK OUT SURFACE AREA OF A RETAIL STORE

CROSS REFERENCE TO RELATED APPLICATIONS

This application is a Continuation-In-Part of U.S. patent application Ser. No. 16/689,356 filed on Nov. 20, 2019, which claims priority to and the benefit of U.S. Provisional Patent Application Ser. No. 62/803,695, filed Feb. 11, 2019, the entirety of which is incorporated herein.

TECHNICAL FIELD

The present disclosure relates generally to a retail store, and more specifically to operating a self-check out (SCO) surface area of the retail store.

BACKGROUND

SCO terminals provide a mechanism for customers to process their own purchases from a retailer. They are an alternative to the traditional cashier-staffed checkout. A typical retail store includes an SCO surface area, i.e. a region, where several SCO terminals are located. At an SCO terminal, the customer is required to scan each item with a scanner themselves, and then execute the requisite payment.

A customer may have little or no training in the operation of an SCO terminal, and may make errors when self-checking out their items. The customer may unintentionally miss some items while scanning, and may exit the store without making a requisite payment. Further, shop-lifting is a major disadvantage associated with SCO terminals. For example, a customer may not scan some items intentionally, and place the unscanned items in their shopping cart, and may exit the store without making full payment. As a result, the retail stores may incur large losses. There exists systems that detect a mismatch between the products present in a shopping basket of the user, and a scanned list of items generated by the scanner. In the event of a mismatch, such system issues an alert to the store tenders, and lock the corresponding SCO terminal, i.e. the customer cannot continue with product scanning.

However, locking of an SCO terminal leads to an increase in the overall time spent by the corresponding user therein, thereby leading to increased queues and reduced customer satisfaction in the SCO surface area. Also, in the SCO surface area, the number of store tenders is limited, which adds to the overall wait times if more SCO terminals require tender attention. In view of the above, there is required a system and method of operating the retail store, that reduces queues and increases customer satisfaction in the SCO surface area.

SUMMARY

In an aspect of the present disclosure, there is provided a system for operating a plurality of SCO terminals of an SCO surface area of a retail store. The system includes a central camera to capture an overview image of the SCO surface area, and a central control unit communicatively coupled to processor of each SCO terminal. The central control unit includes a memory to store one or more instructions, and a central processing unit communicatively coupled to the memory to execute the one or more instructions. The central processing unit is configured to identify a non-scan event at an SCO terminal, check if the number of other already locked SCO terminals is less than a first threshold, lock the SCO terminal if the number of other locked SCO terminals is less than the first threshold, if the number of other locked SCO terminals has reached the first threshold, a check is performed to determine if a number of consecutive non-scan events at the SCO terminal has reached a second threshold, and if the number of consecutive non-scan events detected at the SCO terminal has reached the second threshold, the SCO terminal is locked.

In another aspect of the present disclosure, there is provided a method for operating a plurality of SCO terminals of an SCO surface area of a retail store. The method includes capturing an overview image of the SCO surface area by a central camera, identifying a non-scan event at an SCO terminal, checking if the number of other already locked SCO terminals is less than a first threshold, locking the SCO terminal if the number of other locked SCO terminals is less than the first threshold, if the number of other locked SCO terminals has reached the first threshold, checking if a number of consecutive non-scan events at the SCO terminal has reached a second threshold, and locking the SCO terminal, if the number of consecutive non-scan events detected at the SCO terminal has reached the second threshold.

In yet another aspect of the present disclosure, there is provided a computer programmable product for operating a plurality of SCO terminals of an SCO surface area of a retail store, the computer programmable product comprising a set of instructions. The set of instructions when executed by a processor causes the processor to capture an overview image of the SCO surface area by a central camera, identify a non-scan event at an SCO terminal, check if the number of other already locked SCO terminals is less than a first threshold, lock the SCO terminal if the number of other locked SCO terminals is less than the first threshold, if the number of other locked SCO terminals has reached the first threshold, a check is performed to determine if a number of consecutive non-scan events at the SCO terminal has reached a second threshold, and lock the SCO terminal, if the number of consecutive non-scan events detected at the SCO terminal has reached the second threshold.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

FIG. 8 illustrates a table of outputs from the Processing Unit of the Control Unit of the software of FIG. 4 for operating an SCO surface area of a retail store, in accordance with an embodiment of the present disclosure.

FIG. 9 illustrates a flow chart of a method of operating one or more SCO terminals in an SCO environment, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF ILLUSTRATIVE EMBODIMENTS

The following detailed description illustrates embodiments of the present disclosure and ways in which they can be implemented. Although the best mode of carrying out the present disclosure has been disclosed, those skilled in the art would recognize that other embodiments for carrying out or practicing the present disclosure are also possible.

Figure 1:
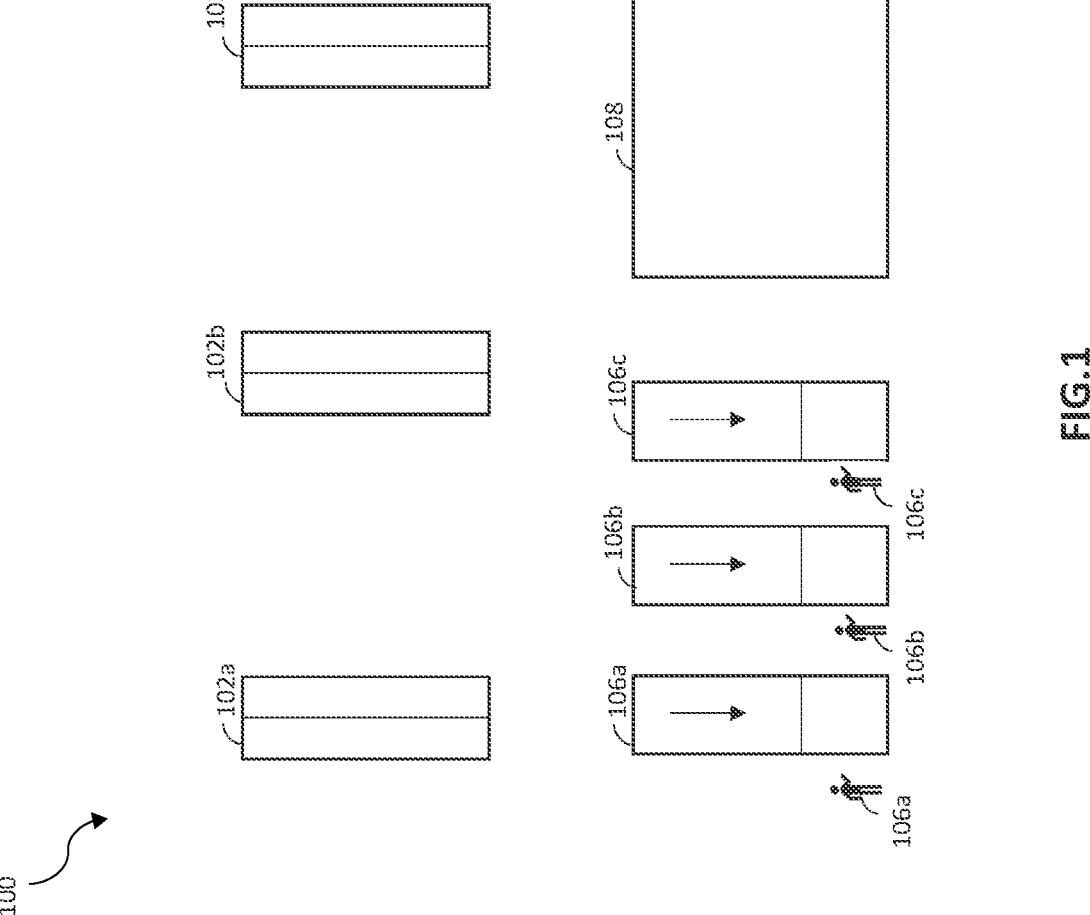
FIG. 1 illustrates a retail store environment, wherein various embodiments of the present invention can be practiced.

Referring to FIG. 1, there is shown a retail store environment 100, wherein various embodiments of the present disclosure can be practiced. The retail store environment 100 includes first through third shelves 102a to 102c for storing and displaying one or more items. The retail store environment 100 further includes first through third cashier terminals 104a to 104c, equipped with first through third cashiers 106a to 106c respectively to scan and bill the items present in the shopping cart of corresponding customers. The retail store environment 100 further includes a SCO surface area 108 that includes one or more SCO terminals to enable respective customers to scan and bill the items present in their shopping cart by themselves. The SCO surface area 108 is further explained in detail with reference to FIG. 2.

Figure 2:
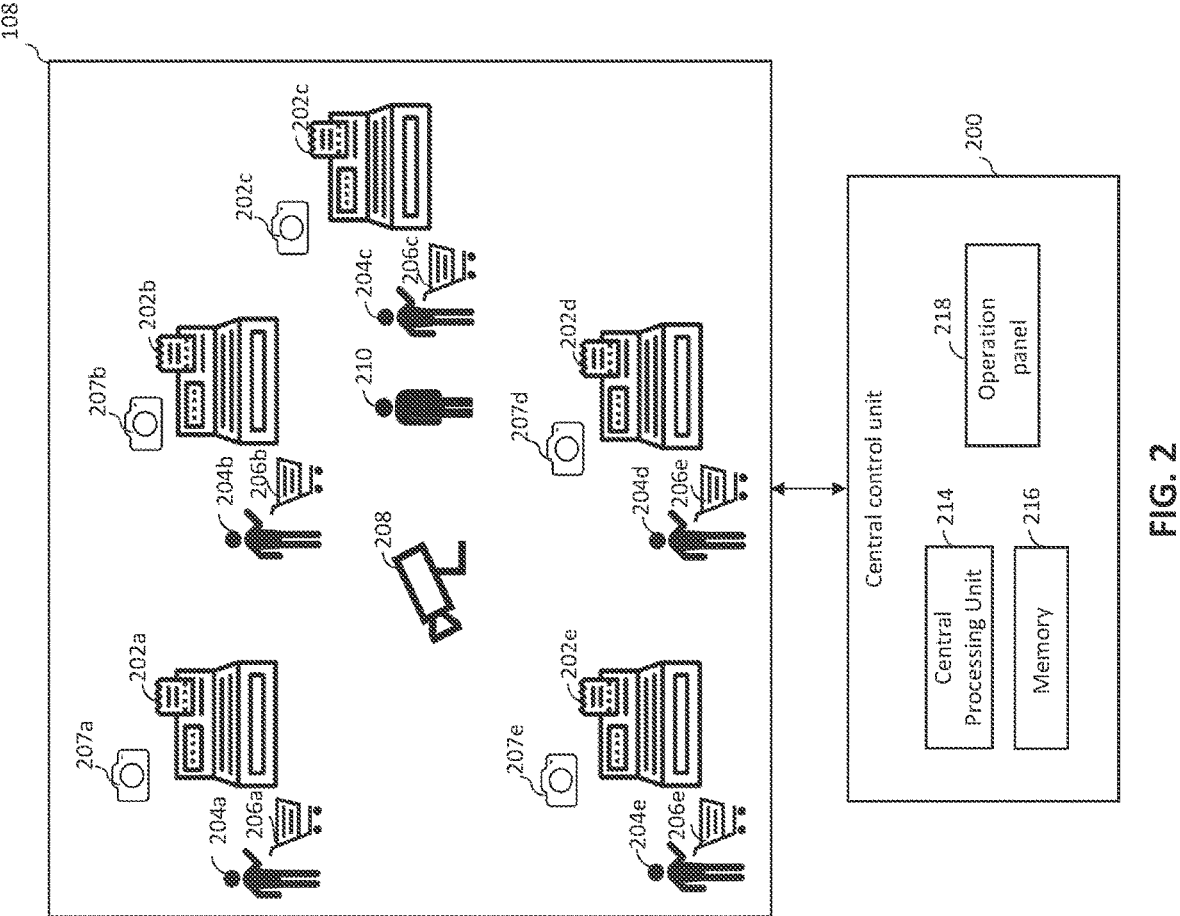
FIG. 2 illustrates a central control unit for operating an SCO surface area of a retail store, in accordance with an embodiment of the present disclosure.

FIG. 2 illustrates a central control unit 200 for operating the SCO surface area 108 of a retail store, in accordance with an embodiment of the present disclosure. The SCO surface area 108 includes first through fifth SCO terminals 202a to 202e (hereinafter referred to as SCO terminals 202), corresponding first through fifth customers 204a to 204e along with their first through fifth shopping carts 206a to 206e, a central camera 208, and one or more store tender 210.

In an embodiment of the present disclosure, various components of the SCO surface area 108 may be communicatively coupled to the central control unit 200 through a communication network. The communication network may be any suitable wired network, wireless network, a combination of these or any other conventional network, without limiting the scope of the present disclosure. Few examples may include a Local Area Network (LAN), wireless LAN connection, an Internet connection, a point-to-point connection, or other network connection and combinations thereof. In an example, the network may include a mobile communication network, for example, 2G, 3G, 4G, or 5G mobile communication network. The communication network may be coupled to one or more other networks, thereby providing coupling between a greater number of devices. Such can be the case, for example, when networks are coupled together via the Internet.

Each SCO terminal 202a to 202e is equipped with a scanner for enabling corresponding customer to scan one or more items themselves, and a user display for enabling a user to make requisite selection and payment of one or more items. In an example, the scanner may be a bar code scanner for scanning bar code of an item, for identifying the item thereof. Preferably, the scanner is a stationary wall or table-mounted scanner, designed for check-out counters of supermarkets, and other retail stores, for scanning items placed in a scanning zone. In the context of the present disclosure, the scanning zone is an area in front of the scanner where the user brings up the items for scanning for the purpose of buying of those items. Each SCO terminal 202a to 202e may include a processor (not shown) for recording scanning of one or more items, and providing instructions on corresponding user display for payment of one or more scanned items. In an embodiment of the present disclosure, the processor of each SCO terminal 202a to 202e may be communicatively coupled to the central control unit 200, for enabling the central control unit 200 to control the operations of the SCO terminals 202, and also process information captured by the central camera 208.

In an embodiment of the present disclosure, each SCO terminal 202a to 202e, is equipped with one or more overhead cameras 207a to 207e respectively to continuously capture the scanning zone of corresponding SCO terminal 202a to 202e, in order to facilitate detection of a scan irregularity due to a mismatch in the items brought up for scanning by the user, and the actual items scanned at each SCO terminal 202a to 202e. The scan irregularity occurs when an item identified for scanning during a predefined time interval is absent in a list of scanned items generated by the scanner during corresponding interval. In an example, a user may place an item in the scanning zone of the scanner, but the user may hold the item in such a way that the bar code of the item may not be visible to the bar code scanner. In such case, the user may place the item in their shopping bag after performing the scan action, but in reality, it may not be scanned by the scanner, and the user may not receive a bill for that item. In an embodiment of the present disclosure, the overhead cameras 207a to 207e may be communicatively coupled to the central control unit 200 such that the central control unit 200 is configured to control the the operations of overhead cameras 207a to 207e, and to also process information captured by the camera 208.

The central camera 208 is configured to generate an overview image of the whole SCO surface area 108. Examples of the central camera 208, include an overhead 360° camera, a 180° camera, and the like. In an embodiment of the present disclosure, the central camera 208 may be communicatively coupled to the central control unit 200, for enabling the central control unit 200 to control the the operations of central camera 208, and also process information captured by the central camera 208. The central camera 208 may facilitate client experience enhancement in the SCO surface area 108, for example, a customer with children or an overflowing shopping cart may be detected by the central camera 208 at an entry point in the SCO surface area 108, and the store tender 210 may be alerted to offer support in the check-out process. If no attendant is available, support may be offered with priority when an attendant becomes available.

Although not shown, the central control unit 200 may be communicatively coupled to a computing device of the store tender 210 to issue alerts/notifications or instructions therein.

In an embodiment of the present disclosure, various components of the SCO surface area 108 may be communicatively coupled to the central control unit 200 through a communication network. The communication network may be any suitable wired network, wireless network, a combination of these or any other conventional network, without limiting the scope of the present disclosure. Few examples may include a LAN connection, wireless LAN connection, an Internet connection, a point-to-point connection, or other network connection and combinations thereof. In an example, the network may include a mobile communication network, for example, 2G, 3G, 4G, or 5G mobile communication network. The communication network may be coupled to one or more other networks, thereby providing coupling between a greater number of devices. Such can be the case, for example, when networks are coupled together via the Internet.

In an embodiment of the present disclosure, the central control unit 200 includes a central processing unit 214, a memory 216 and an operation panel 218. The central processing unit 214 includes a processor, computer, microcontroller, or other circuitry that controls the operations of various components such as the operation panel 218, and the memory 216. The central processing unit 214 may execute software, firmware, and/or other instructions, for example, that are stored on a volatile or non-volatile memory, such as the memory 216, or otherwise provided to the central processing unit 214. The central processing unit 214 may be connected to the operation panel 218, and the memory 216, through wired or wireless connections, such as one or more system buses, cables, or other interfaces.

The operation panel 218 may be a user interface and may take the form of a physical keypad or touchscreen. The operation panel 218 may receive inputs from one or more users relating to selected functions, preferences, and/or authentication, and may provide and/or receive inputs visually and/or audibly.

The memory 216, in addition to storing instructions and/or data for use by the central processing unit 214, may also include user information associated with one or more operators of the SCO surface area 108. For example, the user information may include authentication information (e.g. username/password pairs), user preferences, and other user-specific information. The central processing unit 214 may access this data to assist in providing control functions (e.g. transmitting and/or receiving one or more control signals) related to operation of the operation panel 218, and the memory 216.

In an embodiment of the present disclosure, the central processing unit 214 is configured to detect one or more scan irregularities based on information received from the overhead cameras 207a to 207e and the scanners of the SCO terminals 202a to 202e, and lock corresponding one or more SCO terminals 202a to 202e based on detected scan irregularities, i.e. the customer cannot continue with product scanning. Upon locking, the central processing unit 214 may issue an alert to the store tender 210 accordingly. In the context of the present disclosure, the SCO tender 210 may verify manually if the reported scan irregularities are valid.

In an embodiment of the present disclosure, the central processing unit 214 is configured to automatically lock an SCO terminal such as the first SCO terminal 202a based on a locking status of other SCO terminals. In an example, the central processing unit 214 is configured to lock the first SCO terminal 202a, when a scan irregularity is detected therein, and when the number of already locked other SCO terminals such as the second and third SCO terminals 202b and 202c is less than a first threshold. When the number of already locked other SCO terminals is greater than the first threshold, then the central processing unit 214 disables locking of the first SCO terminal 202a unless the scan irregularities detected at the first SCO terminal 202a has reached a second threshold.

In another embodiment of the present disclosure, the central processing unit 214 is configured to automatically lock an SCO terminal such as the first SCO terminal 202a based on a location of the store tender or SCO surface area supervisor 210, and their status i.e., whether he is free, or busy. The location effectively means physical location, and the physical location of the store tender and the location of the SCO terminal in question is used to determine distance between them. A smaller distance would mean shorter response time from the store tender 210. To take advantage of this, the central processing unit 214 would have the capability to lock the first SCO terminal 202a only if the store attendant in within a pre-defined distance from the SCO terminal. If the distance is greater than the pre-defined distance, then the central processing unit 214 would not lock the first SCO terminal 202a.

In yet another embodiment of the present disclosure, the central processing unit 214 is configured to automatically lock an SCO terminal such as the first SCO terminal 202a based on a length of sequence of non-scan events per SCO terminal, since last locking. It may be possible that although non-scan events occurred at the first SCO terminal 202a, the central processing unit 214 do not lock the terminal, in order to decrease customer friction. In an example, during Black Friday, the central processing unit 214 may be configured to ignore the first three non-scan events of the first SCO terminal 202a. However, if a fourth non-scan event occurs at the first SCO terminal 202a, then the first SCO terminal 202a may be locked.

In yet another embodiment of the present disclosure, the central processing unit 214 is configured to automatically lock an SCO terminal such as the first SCO terminal 202a based on a state of a corresponding cart, for example a full cart (a cart with a lot of products), a bulk loaded cart (a cart with a few items, but in large quantities), or a cart with large objects (i.e., a TV). The large objects are those objects whose size is larger than a predefined threshold size. Also, the scanning of bulk loaded cart is much faster because it involves scanning of few items, and then manually entering the number of occurrences of that item. In an example, the central processing unit 214 may be configured to lock a first SCO terminal 202a when a full cart or bulk loaded cart is detected, and a store tender is available nearby, so that the corresponding customer would receive assistance from the store tender 210. The central processing unit 214 is further configured to notify the store tender 210 for proactive assistance, when a full cart or a bulk loaded cart is being detected at the entry of the SCO surface area 108.

In yet another embodiment of the present disclosure, the central processing unit 214 is configured to automatically lock an exit gate of the SCO surface area 108, and issue a notification for the store tender 210 when a large product is being moved through the exit of SCO surface area 108, without appearing scanned in the list of scanned products. The exit gate is a gate of the retail store, through which the products may be taken out, after the self-check out process is completed.

In yet another embodiment of the present disclosure, the central processing unit 214 is configured to notify the store tender 210 to investigate when a product has changed possession from one customer to another.

In yet another embodiment of the present disclosure, the central processing unit 214 is configured to send an alert to a computing device of the store tender 210 when a size of queue at the entrance of the SCO surface area 108 is greater than a predefined third threshold, so that more potentially available attendants could be assigned to the area. The alert may be in form of an audible signal, visual display, haptic alert, instant message, etc. The entrance of the SCO surface area 108 may be an entry point from where the customers enter the SCO surface area 108 for initiating self-check out process. The central processing unit 214 may be configured to change the first and second thresholds, when the queue length at an entry in the SCO surface area 108 is above a third threshold. In the context of the present disclosure, the queue length may be automatically determined using a 360 degree camera.

In yet another embodiment of the present disclosure, the central processing unit 214 is configured to automatically lock an SCO terminal based on emergency events, for example, someone having a gun. In an embodiment of the present disclosure, the emergency situations may be detected using video cameras and the central camera 208. In an example, someone having (actually waving) a gun may be detected using the central camera 208.

In an embodiment of the present disclosure, the above-mentioned parameters may be pre-configured by a store manager of corresponding retail store, or someone who manages the whole security system. Based on the pre-configured parameters, real-time information captured by the central camera 208 and overhead cameras 207a to 207e, state of SCO terminals 202, state of SCO attendants 210, the central processing unit 214 automatically controls the locking of the SCO terminals 202, and send messages to the store tender 210, and the store manager. In an embodiment of the present disclosure, the central processing unit 214 is configured to dynamically create and adapt store-customer interactions of each SCO terminal 202a to 202e of the SCO surface area 108, and optimizes customer flow at the SCO terminals 202. The SCO terminal may be unlocked upon intervention of the store tender/attendant/SCO surface area supervisor 210.

In various embodiments of the present disclosure, the central processing unit 214 is configured to reduce overall waiting queues and increase customer satisfaction in the SCO surface area 108, by weighing the cost of tender intervention at SCOs 202a to 202e with the cost of potential product leakage (products which may leave the store without being billed). In an embodiment of the present disclosure, the central processing unit 214 may be configured to calculate a cost value for every minute of customer wait time and for every leaked product. This cost may be weighted against the cost of another leaked product. The central processing unit 214 may be further configured to predict aggregated wait times by taking into account the number of locked terminals, the number of store attendance in the area, and the queue length at entry in the SCO area, and build a model indicating how many more minutes of wait time may be added if a new alert is triggered.

FIG. 2 is merely an example. One of ordinary skill in the art would recognize many variations, alternatives, and modifications of embodiments herein.

Figure 3:
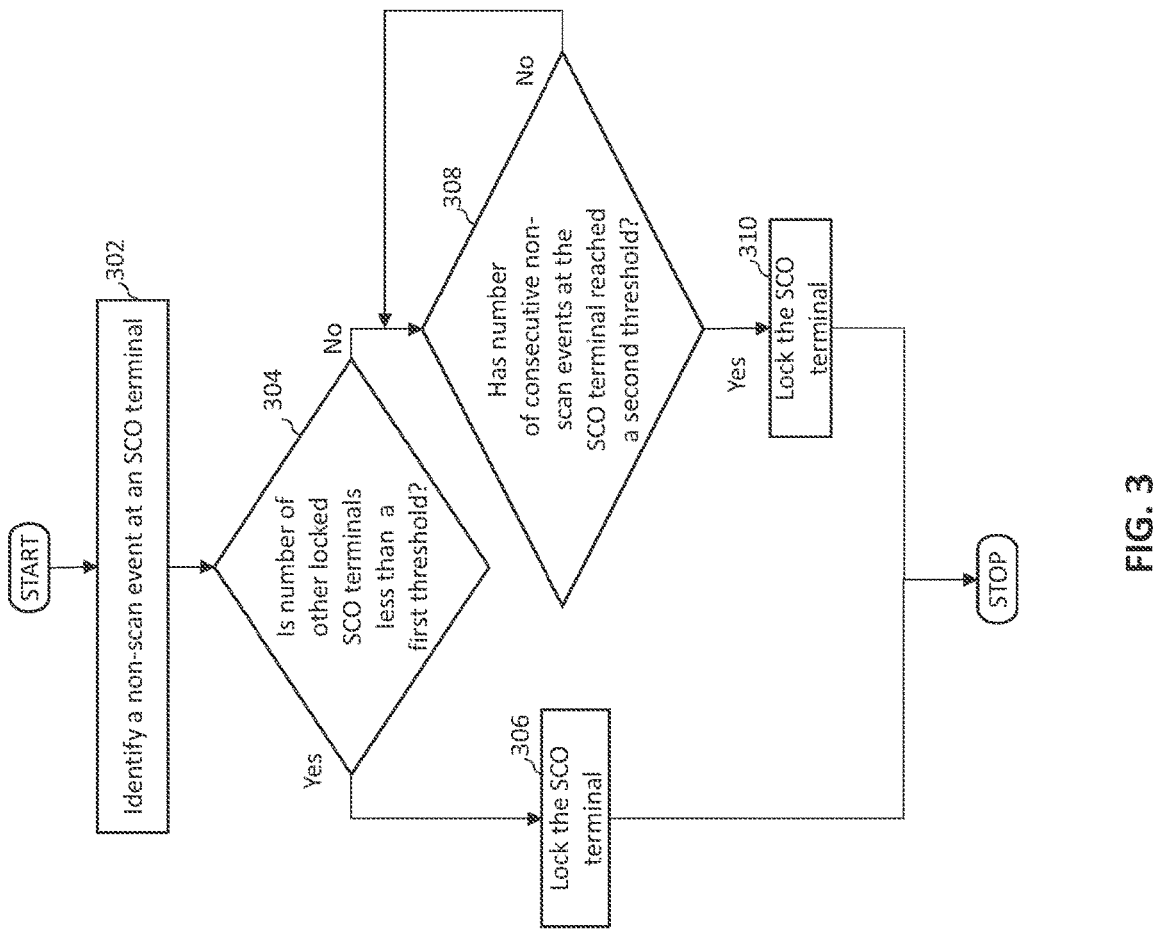
FIG. 3 is an illustration of steps of a method of operating the SCO surface area of the retail store, in accordance with another embodiment of the present disclosure.

FIG. 3 is an illustration of steps of a method 300 of operating an SCO surface area 108 by a central processing unit 214 the central control unit 200, in accordance with the present disclosure. The method is depicted as a collection of steps in a logical flow diagram, which represents a sequence of steps that can be implemented in hardware, software, or a combination thereof.

At a step 302, a non-scan event is identified at an SCO terminal of an SCO surface area. The non-scan event is referred to as an event when the user brings up an item for scanning in the scanning zone of corresponding scanner, but it may or may not be successfully scanned by the scanner. In an example, a user may place an item in the scanning zone of the scanner, but the user may hold the item in such a way that the bar code of the item may not be visible to the bar code scanner. The action corresponding to non-scan event may not be captured by the scanner, but it may be captured by the overhead camera disposed therein.

At a step 304, a check is performed to determine if the number of other locked SCO terminals is less than a first threshold, and at step 306, the SCO terminal is automatically locked, if the number is less than the first threshold. The value of the first threshold may be set based on the number of SCO terminals and store tenders in corresponding SCO surface area.

If the number of other locked SCO terminals has reached than the first threshold, at step 308, a check is performed to determine if a number of consecutive non-scan events at the SCO terminal has reached a second threshold.

At step 310, the SCO terminal is automatically locked, if the number of consecutive non-scan events detected has reached the second threshold. In an example, the value of the first threshold may be 2, and the value of the second threshold may be 3. Thus, when, there are already at least two terminals that are locked, then a third terminal would be locked only if the current non-scan event is a third non-scan event in the current transaction.

FIG. 3 is merely an example. A person skilled in the art will recognize many variations, alternatives, and modifications of embodiments of the present disclosure.

Figure 4:
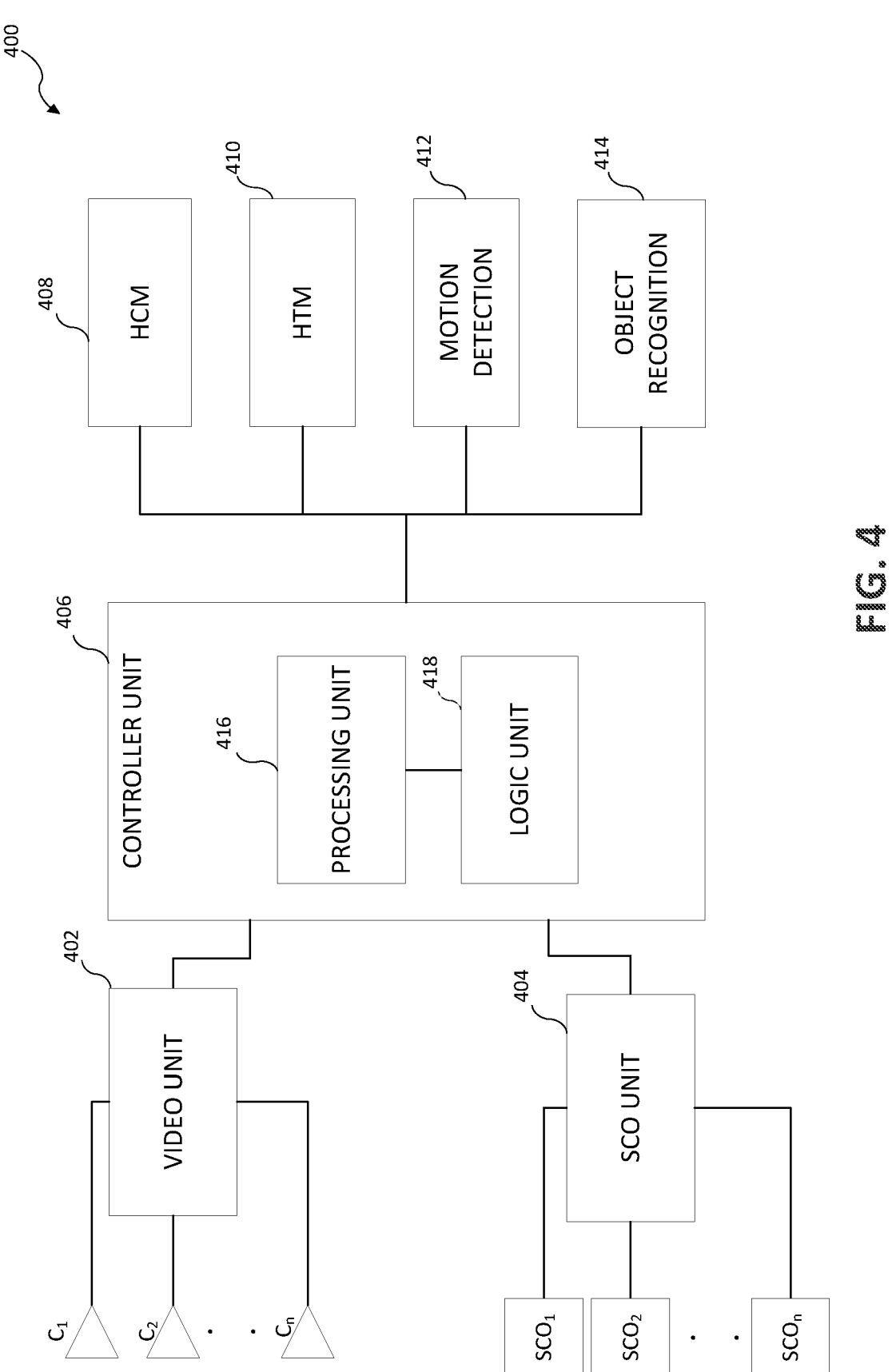
FIG. 4 illustrates a block diagram of the software for operating an SCO surface area of a retail store, in accordance with an embodiment of the present disclosure.

FIG. 4 is an illustration of a block diagram of the software 400 for operating an SCO surface area of a retail store, in accordance with an embodiment of the present disclosure. The software 400 comprises a Video Unit 402 communicably coupled with a plurality of video sensors, comprising a plurality of video cameras $C_1$ to $C_n$ installed at different locations around the retail store (not shown). Each of at least some of the video cameras $C_1$ to $C_n$ are installed at positions within a pre-defined distance of a SCO terminal $SCO_1$ to $SCO_n$ in the retail store (not shown). Specifically, each of the at least some video cameras $C_1$ to $C_n$ is installed at a position directly overhead one of the SCO terminals $SCO_1$ to $SCO_n$, to obtain a bird's eye view thereof.

In an embodiment, the video cameras $C_1$ to $C_n$ are configured to capture video footage of an environment within the Field of View of the video cameras $C_1$ to $C_n$. The video footage from a video camera $C_1$ to $C_n$ (not shown) comprises a plurality of successively captured video frames, wherein p is the number of video frames in the captured video footage. A given video frame $Fr(\tau+i\Delta t) \varepsilon \mathbb{R}^{n \times m}$ is captured by a video camera $C_1$ to $C_n$ at a time instant (also known as sampling time) $\tau+i\Delta t$ wherein $\tau$ is the time at which capture of the video footage starts and $\Delta t$ is the time interval (also known as the sampling interval) between the capture of a first video frame and the capture of the next video frame. Using this notation, the video footage captured by a video camera $C_1$ to $C_n$ can be described as VID $\varepsilon \ \mathbb{R}^{\ n\times(p\times m)}=[Fr(\tau), Fr(\tau+\Delta t), Fr(\tau+2\Delta t) \ . . . \ Fr(\tau+p\Delta t)]$ In an embodiment, the software 400 further comprises a SCO Unit 404 which is communicably coupled with a plurality of SCO terminals $SCO_1$ to $SCO_n$ in the retail store. In particular, the SCO Unit 404 is configured to receive a transaction data, comprising a Sale Till data from each of the SCO terminals $SCO_1$ to $SCO_n$, wherein the Sale Till data comprises the Universal Product Code (UPC) of a product detected by a scanner device (not shown) of the SCO terminal $SCO_1$ to $SCO_n$ during a scan of the product performed at the SCO terminal $SCO_1$ to $SCO_n$. The Sale Till data further comprises the quantity of those same products.

In an embodiment, the SCO Unit 404 is further configured to receive a Status Signal from each SCO terminal $SCO_1$ to $SCO_n$. The Status Signal may comprise an indicator of whether a SCO terminal $SCO_1$ to $SCO_n$ is locked or active. The Status Signal may further comprise a time stamp of when a SCO terminal $SCO_1$ to $SCO_n$ became locked. In one embodiment, the Status Signal may be obtained from an NCR Remote Access Program (RAP) Application Program Interface (API). However, the person skilled in the art will acknowledge that the above-mentioned source of the Status Signal is provided for illustration purposes only. In particular, the skilled person will acknowledge that the software of the preferred embodiment is not limited to the above-mentioned source of the Status Signal. On the contrary, the software of the preferred embodiment is operable with any source of the Status Signal including an API of any manufacturer of a SCO terminal.

In an embodiment, the SCO Unit 404 is further configured to issue control signals to each SCO terminal $SCO_1$ to $SCO_n$ to lock a SCO terminal. In one embodiment, the issuance of a control signal to a given SCO terminal $SCO_1$ to $SCO_n$, the receipt of the control signal by the relevant SCO terminal and execution thereby of the locking operation in response to the received control signal is undertaken through the NCR Remote Access Program (RAP) Application Program Interface (API). However, the person skilled in the art will acknowledge that the above-mentioned mechanism for the issuance of control signals to a SCO terminal, receipt of the control signals by the relevant SCO terminal and execution of the locking of the SCO terminal is provided for illustration purposes only. In particular, the skilled person will acknowledge that the software of the preferred embodiment is not limited to the above-mentioned mechanism. On the contrary, the software of the preferred embodiment is operable with any mechanism for issuing control signals to a SCO terminal, receiving the control signals by the relevant SCO terminal and execution of the locking thereof, including an API of any manufacturer of a SCO terminal.

In an embodiment, the software 400 further comprises a Control Unit 406 communicably coupled with the Video Unit 402 and the SCO Unit 404. The Control Unit 406 is configured to receive, from the Video Unit 402, video footage captured by the video cameras $C_1$ to $C_n$. The Control Unit 406 is further configured to receive, from the SCO Unit 404, a Status Signal from each SCO terminal $SCO_1$ to $SCO_n$. A Status Signal may include an indicator as to whether a corresponding SCO is locked or operational. In the event the SCO is locked, the Status Signal from the SCO terminal may include a time stamp indicating the time at which the SCO terminal was locked. Similarly, the Control Unit 406 is configured to issue control signals to the SCO Unit 404, the said control signals being configured to cause the locking of a designated SCO terminal.

In an embodiment, the Control Unit 406 is further communicably coupled with a Human Classification Module 408, a Human Tracking Module 410, a Motion Detection Module 412 and an Object Recognition Module 414. Each of these and their operations will be described in more detail below. The Control Unit 406 itself comprises a Processing Unit 416 communicably coupled with a Logic Unit 418 which is in turn communicably coupled with the SCO Unit 404. Each of these and their operations will also be described in more detail below.

In an embodiment, the Human Classification Module 408 is configured to receive video frames from the video footage captured by the video cameras $C_1$ to $C_n$ installed at different locations around the retail store (not shown) from the Control Unit 406. In another embodiment, the Human Classification Module 408 is configured to process a video frame $Fr(\tau+i\Delta t) \ \varepsilon \ \mathbb{R}^{\ n\times m}$ to detect the presence of people therein and to classify each of the detected persons as being one of a child, an adult customer and a member of staff.

In an embodiment, the Human Classification Module 408 may be implemented by an object detection Machine Learning (ML) algorithm such as EfficientDet (as described in M. Tan, R. Pang and Q. V. Le, EfficientDet: Scalable and Efficient Object Detection, 2020 IEEE/CVF Conference on Computer Vision and Pattern Recognition (CVPR), Seattle, WA, USA, 2020, pp. 10778-10787). Alternatively, the Human Classification Module (HCM) 408 may be implemented by a panoptic segmentation algorithm such as the bidirectional aggregation network (BANet) (as described in Y. Chen, G. Lin, S. Li, O. Bourahla, Y. Wu, F. Wang, J. Feng, M. Xu, X. Li, Banet: Bidirectional aggregation network with occlusion handling for panoptic segmentation, in: Proceedings of the IEEE/CVF Conference on Computer Vision and Pattern Recognition, 2020, pp. 3793-3802).

The skilled person will acknowledge that the above examples of algorithms used for object detection and panoptic segmentation are provided for illustration purposes only. In particular, the skilled person will acknowledge that the preferred embodiment is not limited to the above algorithms. On the contrary, the preferred embodiment is operable with any algorithms suited for detection of objects in a video frame, or combined instance segmentation and semantic segmentation of a video frame, such as YOLOv4 (as described in A Bochkovskiy, C-Y Wang and H-Y M Liao, 2020 arXiv: 2004.10934) and AuNet (as described in Y. Li, X. Chen, Z. Zhu, L. Xie, G. Huang, D. Du, X. Wang, Attention guided unified network for panoptic segmentation, in: Proceedings of the IEEE/CVF Conference on Computer Vision and Pattern Recognition, 2019, pp. 7026-7035) respectively.

The purpose of the object detection or panoptic segmentation algorithms is to:

detect one or more people appearing in a video frame;

establish localization information for a detected person (for example, by a frame or interest (interchangeably referred to as bounding box hereinafter) established by an object detection algorithm around a detected person in the video frame); and determine whether the detected person is an adult customer, a child or a member of staff).

Figure 5:
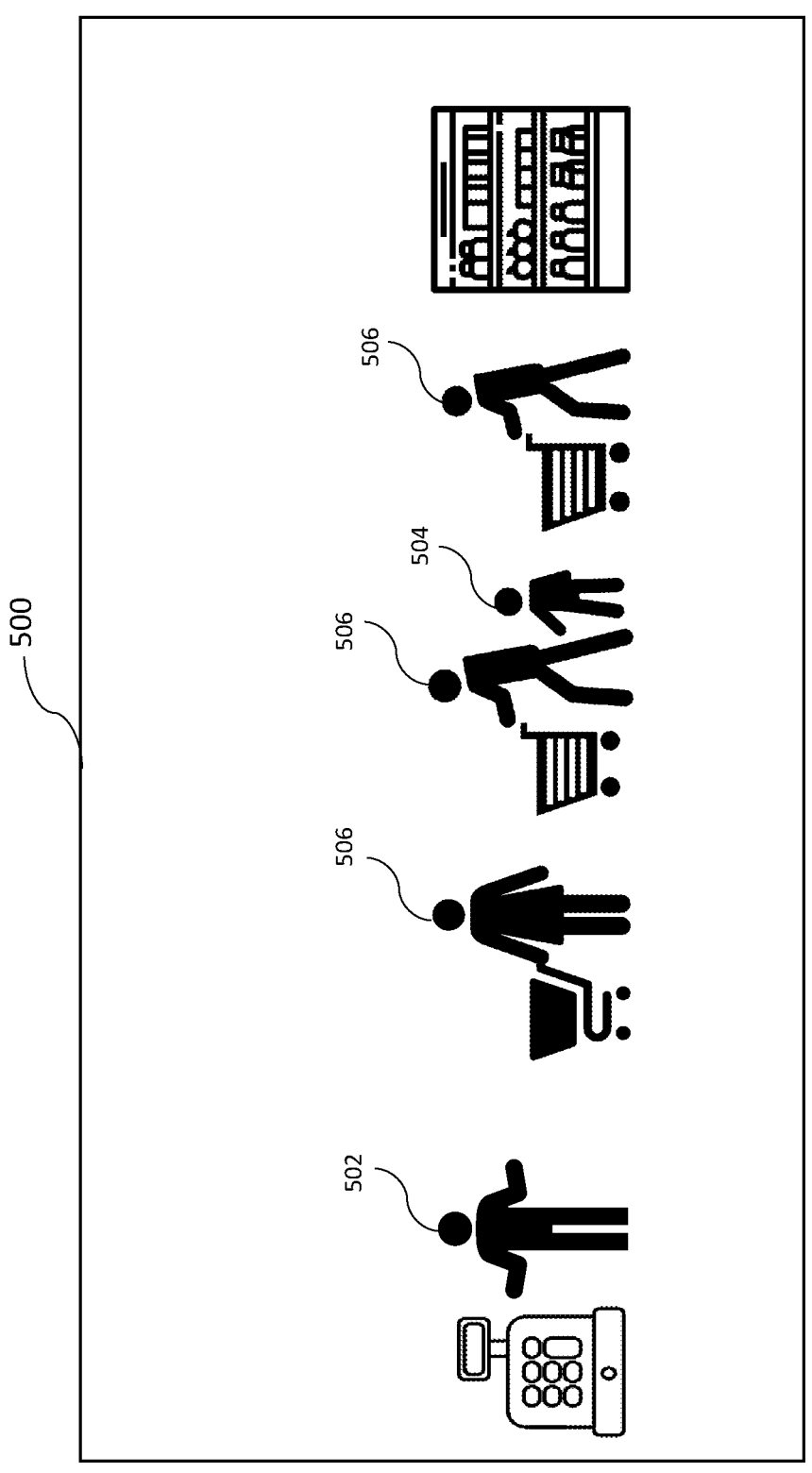
FIG. 5 illustrates an example of a video frame captured by a video camera installed in the retail store; and the processing of the video frame by the Human Classification Module of the software of FIG. 4, in accordance with an embodiment of the present disclosure.

FIG. 5 illustrates an example of a video frame $Fr(\tau+i\Delta t) \ \varepsilon \ \mathbb{R}^{\ n\times m}$ captured by a video camera $C_1$ to $C_n$ installed in the retail store (not shown); and the processing of the video frame by the Human Classification Module 408 of the software 400 of FIG. 4, in accordance with an embodiment of the present disclosure.

In an embodiment, now referring to FIG. 5, an object detection algorithm detects a primary subject of interest consisting of people in a received video frame 500 and ignores, a secondary subject of interest, such as the cash till, shopping trolley and stacked goods appearing in the video frame 500. The detected people are illustrated by the bounding boxes substantially surrounding each thereof. The bounding boxes facilitate subsequent tracking of individual persons. The object detection algorithm then distinguishes between the staff member 502, the child 504 and adult customers 506. The distinction between a staff member 502 and an adult customer 506 may be premised on the staff member 502 wearing a uniform of distinctive colouring or with distinctive patterning including a prominent logo thereon.

In an embodiment, the object detection or panoptic segmentation algorithms are trained with video frames selected from video footage captured by a plurality of video cameras installed at different locations within the retail store. The video frames which will be referred to henceforth as the Training Dataset. The individual video frames of the Training Dataset are selected and compiled to provide robust, class-balanced information about staff members, children and adult customers derived from views thereof obtained with different positioning and orientation relative to the video cameras. In addition, the video frames of the Training Dataset are selected from video footage acquired from a variety of locations within the retail store. Similarly, the video frames of the Training Dataset comprise individuals in different types and colour of clothing. Members of the Training Dataset may also be subjected to further data augmentation techniques (such as rotation, flipping, brightness alteration) to generate more video frames to thereby increase the size of the Training Dataset, preventing overfitting and regularizing the deep neural network model; to balance the classes within the Training Dataset; and to synthetically generate new video frames that are more representative of the task at hand. Accordingly, the video frames of the Training Dataset are balanced in relation to gender, age and skin colour.

The video frames of the Training Dataset for the object detection algorithm are manually tagged with bounding boxes arranged to substantially surround each individual visible in a video frame and with corresponding class labels of adult customer/staff/child as appropriate. Members of the Training Dataset are organised in in a pairwise fashion, wherein each data pair comprises a video frame and a corresponding XML file. The XML file contains the bounding box(es) coordinates relative to the co-ordinate system of a video frame and the corresponding label for each bounding box.

By contrast, the individual pixels of each video frame of the Training Dataset for the panoptic segmentation algorithm is manually tagged with class labels of adult customer/staff/child as appropriate. The individual pixels are also tagged with instance numbers indicating with which instance of a given class the pixel corresponds. For example, an instance number may indicate if a pixel corresponds with a second adult customer visible in a video frame or a third child visible in the video frame. Members of the Training Dataset are organised in in a pairwise fashion, wherein each data pair comprises a video frame and a corresponding XML file. The XML file contains the class label and instance number of each pixel in the corresponding video frame.

In an embodiment, now returning to FIG. 4, on completion of the training of the object detection algorithm, its output in response to a video frame $Fr(\tau+i\Delta t) \varepsilon \mathbb{R}^{n \times m}$ subsequently received by the Human Classification Module 408, comprises a set of bounding boxes (each box being defined by two opposite corners) $(Bnd\_Bx_i(t))$ and a corresponding set of class labels. By contrast, on completion of the training of the panoptic segmentation algorithm, its output in response to a video frame $Fr(\tau+i\Delta t) \varepsilon \mathbb{R}^{n \times m}$ subsequently presented to the Human Classification Module 408, comprises a class label and instance number provided for each pixel in the video frame $Fr(\tau+i\Delta t) \varepsilon \mathbb{R}^{n \times m}$. The Human Classification Module 408 is configured to communicate this output to the Control Unit 406.

In an embodiment, the Human Tracking Module 410 is configured to receive from the Control Unit 406 video frames from the video footage captured by the video cameras $C_1$ to $C_n$ installed at different locations A typical person re-identification algorithm assumes that the physical appearance of a person will not significantly change from one video frame to another. Thus, physical appearance becomes key information that can be used to re-identify the person. Accordingly, the Human Tracking Module 410 represents a person through a variety of rich semantic features about visual appearance, body movement and interaction with the surroundings. These semantic features essentially form a biometric signature of the person which is used to reidentify the person in different video frames.

In an embodiment, the Human Tracking Module 410 builds an internal repository of the semantic features of persons in the store. For brevity, this internal repository will be referred to henceforth as the Gallery Feature Set. The Gallery Feature Set is populated with feature representations of each person extracted by a trained person re-identification neural network model. Since the specific identities of these people is largely unknown, the semantic features of each person are associated therewith through a person identification data. The person identification data essentially comprises a Person Identifier (PID). In other words, the Human Tracking Module 410 links the biometric signature of a person with a $PID_i$ of that person. Both the $PID_i$, and the corresponding biometric information in the Gallery Feature Set will be deleted at the end of each day or more frequently as required by the operators.

In an embodiment, with a further video frame may be selected in which a person is visible (i.e. a Query Image of a Query Person), the trained person re-identification network extracts the feature representation of the person, to establish the relevant semantic features thereof. The feature representation of the person in the query image may correspond to a query identification data. The extracted feature representation is compared with those in the Gallery Feature Set. If a match is found, the person is identified as the person with the $PID_i$ corresponding with the matching feature representation in the Gallery Feature Store. If the feature representation of the Query Person from the Query Image does not match any in the Gallery Feature Set, a new unique $PID_i$ is allocated to the person, and the corresponding feature representation of the person is added to the Gallery Feature Set and associated with the $PID_i$.

In an embodiment, the person re-identification network uses the standard ResNet architecture. However, the skilled person will acknowledge that this architecture is provided for illustration purposes only. In particular, the skilled person will acknowledge that the preferred embodiment is not limited to the use of this architecture. On the contrary, the preferred embodiment is operable with any neural network architecture capable of forming an internal representation of the semantic features of a person. For example, the person re-identification network may also employ a Batch Normalization (BN)-Inception architecture to make training of machine learning algorithm faster and more stable through normalization of the layers' inputs by re-centering and re-scaling. In use, the person re-identification network is trained using a dataset containing:

video frames in which people appear; and annotated bounding boxes substantially surrounding each person visible in each of the video frames In an embodiment, the annotation of each bounding box will include the $PID_i$ of the person enclosed by the bounding box. This enables a same person to be identified across multiple video frames collected from a set of video cameras. Therefore, a set of bounding boxes annotated with the same $PID_i$ will encapsulate appearance information of the same person extracted from different views thereof. Thus, the training data comprises a set of video frames, each of which is described by the frame number, the $PID_i$ of a person visible in the video frame and the corresponding bounding box details. Because several people could be visible in a single video frame, the training data for any such video frame will comprise multiple entries, one for each person visible in the video frame.

The output from the Human Tracking Module 410 is a set of data which details the times and locations in the retail store at which a person was detected in a video frame $Fr(\tau+i\Delta t) \; \varepsilon \; \mathbb{R}^{n \times m}$ captured by video cameras installed at different locations within the retail store. The detected locations of the person are established from the co-ordinates of bounding boxes established in each video frame in which a person is visible and the identity of the video camera that captured the video frame. The output from the Human Tracking Module 410 may also comprise the extracted feature representation of the person.

In an embodiment, the Human Tracking Module 410 is configured to communicate the output from the Human Tracking Module 410, to the Control Unit 406.

In an embodiment, the Motion Detection Unit 412 is configured to receive video footage from video camera(s) (not shown) mounted directly overhead a SCO terminal (not shown) in the retail store (not shown), to provide a bird's eye view of the SCO terminal (not shown). The Motion Detection Unit 412 is configured to process successively captured video frames $Fr(\tau)$ and $Fr(\tau+\Delta t)$ in the received video footage to detect movement within a pre-defined distance of the SCO terminal (not shown), wherein the said pre-defined distance is determined by the intrinsic parameters of the video camera(s) (not shown) which together with their location overhead the SCO terminal (not shown) establish the Field of View of the video camera(s) (not shown).

In one embodiment, the video frames in the received video footage are encoded using the H.264 video compression standard. The H.264 video format uses motion vectors as a key element in compressing video footage. The Motion Detection Unit 412 uses motion vectors obtained from the decoding of the H.264 encoded video frames to detect movement within a pre-defined distance of the SCO terminal (not shown). In another embodiment, successive samples $(Fr(\tau+q\Delta t), Fr(\tau+(q+1)\Delta t))$ from the video footage are compared to detect differences therebetween. Differences exceeding a pre-defined threshold are deemed to be indicative of the occurrence of movement in the intervening period between the successive samples. The threshold is configured to avoid transient changes, such as light flickering, being mistaken for motion. On detection by the Motion Detection Unit 412 of movement within a pre-defined distance of the SCO terminal (not shown), a "Motion Trigger" signal is transmitted by the Motion Detection Unit 412 to the Control Unit 406.

In an embodiment the Object Recognition Module 414 is configured to receive video footage from video camera(s) mounted directly overhead a SCO terminal (not shown) in the retail store (not shown), to provide a bird's eye view of the SCO terminal (not shown). The Object Recognition Module 414 may also be configured to receive video footage from a video camera (not shown) mounted within a pre-defined distance of the SCO terminal (not shown), and arranged so that its Field of View encompasses a region in which a customer would approach the SCO terminal (not shown) with products to be purchased. The Object Recognition Module 414 is configured to recognize and identify specified objects visible in a received video frame. In one embodiment, an object may include a product from the retail store's stock inventory. In another embodiment, an object may include a full shopping cart.

Figure 6:
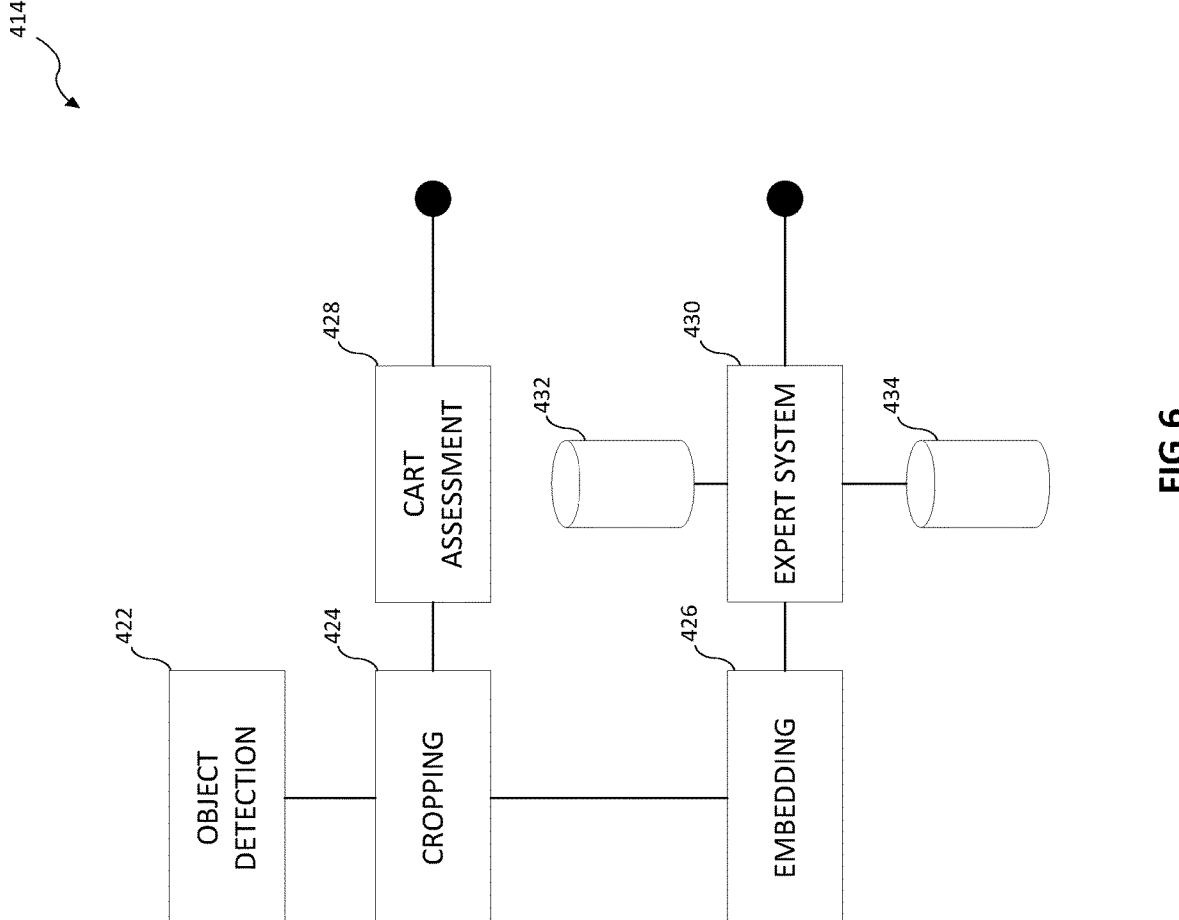
FIG. 6 illustrates an Object Recognition Module of the software of FIG. 4 for operating an SCO surface area of a retail store, in accordance with an embodiment of the present disclosure.

Now, referring to FIG. 6, which illustrates an Object Recognition Module of the software of FIG. 4 for operating an SCO surface area of a retail store, in accordance with an embodiment of the present disclosure.

In an embodiment, the Object Recognition Module 414 comprises an Object Detection Module 422 communicably coupled with a Cropping Module 424 which is communicably coupled in turn with an Embedding Module 426 and a Cart Assessment Module 428. The Embedding Module 426 is further communicably coupled with an Expert System 430 which is also communicably coupled with an Embedding Database 432 and a Product Database 434. Each of these and their operations will be described in detail below.

The input of the Object Detection Module 422 are video frames $Fr(\tau+i\Delta t) \; \varepsilon \; \mathbb{R}^{n \times m}$ from video footage captured by video cameras disposed within a pre-defined distance of the SCO terminals (not shown) in the retail store (not shown). The pre-defined distance is determined empirically according to the layout of the retail store (not shown) and the SCO terminals (not shown) therein to permit the detection of products being scanned at a SCO terminal (not shown) and the detection of shopping carts as they approach the SCO terminal (not shown). The output from the Object Detection Module 422 comprises the location $(Loc(Obj_i))$ of each object $(Obj_i)$ visible in a video frame $Fr(\tau+i\Delta t) \; \varepsilon \; \mathbb{R}^{n \times m}$ as denoted by a bounding box substantially surrounding the object; and a corresponding class label therefor. Thus, the Object Detection Module 422 output comprises the locations of and labels for all the objects visible in a video frame $Fr(\tau+i\Delta t) \; \varepsilon \; \mathbb{R}^{n \times m}$.

Accordingly, for a given video frame $Fr(\tau+\Delta t)$, the Object Detection Module 422 is configured to determine the co-ordinates of a bounding box substantially surrounding an object detected in the video frame. The co-ordinates of a bounding box are established with respect to the co-ordinate system of the received video frame. Specifically, for a given video frame $Fr(\tau+i\Delta t)$, the Object Detection Module 422 is configured to output one or more details of a set of bounding boxes $B(\tau+i\Delta t)=[\underline{b}_1(\tau+i\Delta t), \underline{b}_2(\tau+i\Delta t) \ldots \underline{b}_j(\tau+i\Delta t))]^T$, $j \leq N_{obj}$ $(\tau+i\Delta t)$, where $N_{obj}(\tau+i\Delta t)$ is the number of objects detected in the video frame $Fr(\tau+i\Delta t)$ and $\underline{b}_j(\tau+i\Delta t)$ is the bounding box encompassing a $j^{th}$ detected product. The details of each bounding box $(\underline{b}_j(\tau+i\Delta t))$, comprise four variables, namely [x,y], h and w, where [x,y] is the co-ordinates of the upper left corner of the bounding box relative to the upper left corner of the video frame (Fr(τ+iΔt)). For brevity, the details of each bounding box ($\underline{b}_j$(τ+iΔt)), will be referred to henceforth as Bounding Box Coordinates.

IN an embodiment, the Object Detection Module 422 comprises a deep neural network whose architecture is substantially based on the EfficientDet (as described in M. Tan, R. Pang and Q. V. Le, EfficientDet: Scalable and Efficient Object Detection, 2020 IEEE/CVF Conference on Computer Vision and Pattern Recognition (CVPR), Seattle, WA, USA, 2020, pp. 10778-10787). The architecture of the deep neural network may also be based on YOLOv4 (as described in A Bochkovskiy, C-Y Wang and H-Y M Liao, 2020 arXiv: 2004.10934). However, the skilled person will acknowledge that these neural network architectures are provided for illustration purposes only. In particular, the skilled person will understand that the preferred embodiment is not limited to these deep neural network architectures. On the contrary, the preferred embodiment is operable with any deep neural network architecture and/or training algorithm which is suitable for the detection and localization of an object in a video frame. For example, the preferred embodiment is operable with a Region Based Convolutional Neural Network (RCNN), Faster-RCNN or Single Shot Detector (SSD)).

The goal of training the deep neural network of the Object Detection Module 422 is to cause it to establish an internal representation of an object, which allows the deep neural network to recognize the presence of the object in subsequently received video footage. To this end, the dataset used to train the deep neural network of the Object Detection Module 422 comprises a plurality of video frames captured by video cameras disposed within a predefined distance of the SCO terminals (not shown) in the retail store. The pre-defined distance is determined empirically according to the layout of the retail store and the SCO terminals (not shown) therein to permit the detection of products being scanned at the SCO terminal (not shown) and the detection of shopping carts as they approach the SCO terminal (not shown). The video frames are selected and compiled to provide robust, class-balanced information about subject objects derived from views of objects obtained with different positioning and orientation thereof relative to the video cameras (not shown). For clarity, this dataset will henceforth be referred to as the Training Dataset.

Prior to their use in the Training Dataset, video frames of similar appearance are removed therefrom. Members of the Training Dataset may also be subjected to further data augmentation techniques (such as rotation, flipping, brightness alteration) to generate more video frames to thereby increase the size of the Training Dataset, preventing overfitting and regularizing the deep neural network model; to balance the classes within the Training Dataset; and to synthetically generate new video frames that are more representative of the task at hand. In a further pre-processing step, individual video frames of the Training Dataset are provided with one more bounding boxes, wherein each such bounding box is arranged to substantially enclose an object visible in the video frame. Individual video frames are also provided with a class label of "Product" or "Shopping Cart" or "other" as appropriate corresponding to the or each bounding box in the respective video frame. The class label "Product" indicates that the detected object is a product contained in the retail store's stock inventory, as opposed to a personal item belonging to a customer that might also be visible in a video frame. The class label "Shopping Cart"

indicates that the detected object is a shopping cart which may have varying degrees of fullness.

In an embodiment, the Object Detection Module 422 is further configured to concatenate the Bounding Box Coordinates of each object detected in a video frame with the corresponding label classification of the detected object to form a Detected Object Vector. Specifically, the output from the Object Detection Module 422 is one or more Detected Object Vectors $$DO(\tau + i\Delta t) = [B(\tau + i\Delta t), L(\tau + i\Delta t)]^T \in \mathbb{R}^{5 \times N_1^{obj}(\tau + i\Delta t)},$$

wherein the Object Detection Module 422 is further configured to communicate this output to the Cropping Module 424.

In an embodiment, the Cropping Module 424 is communicably coupled with the Object Detection Module 422 to receive therefrom the Detected Object Vectors DO(τ+iΔt). The Cropping Module 424 is further configured to receive the video frames Fr(τ+iΔt) ε $\mathbb{R}^{n \times m}$ also received by the Object Detection Module 422. The Cropping Module 424 is configured to crop from each received video frame, a Product Cropped Region whose peripheries are established by the Bounding Box Coordinates of the corresponding Detected Object Vector DO(τ+iΔt), whose class label is "Product". The Cropping Module 424 is further configured to resize each Product Cropped Region to a same predefined size. The predefined size, which will be referred to henceforth as the "Processed Product Image Size", is established empirically as being that which delivers optimal product recognition by the Embedding Module 426. The Cropping Module 424 is further configured to transmit the resulting Product Cropped Region to the Embedding Module 426.

In an embodiment, the Cropping Module 424 is further configured to crop from each video frame of the video footage received from a video camera, a Cart Cropped Region whose peripheries are established by the Bounding Box Coordinates of the corresponding Detected Object Vector DO(τ+iΔt), whose class label is "Shopping Cart". The Cropping Module 424 is further configured to resize each Cart Cropped Region to a same predefined size. The predefined size, which will be referred to henceforth as the "Processed Cart Image Size", is established empirically as being that which delivers optimal assessment of a shopping cart's state of fullness by the Cart Assessment Module 428. The Cropping Module 424 is further configured to transmit the resulting Cart Cropped Region to the Cart Assessment Module 428.

In an embodiment, the Embedding Module 426 has two distinct operational stages, namely an initial configuration stage and a run-time stage as will be described below. The Embedding Module 120 employs a deep metric learning module as reviewed in K. Musgrave, S Belongie and S.-N. Li, A Metric Learning Reality Check (retrieved from https://arxiv.org/abs/2003.08505 on 19 Aug. 2020) to learn a unique representation, in the form of an embedding vector, of each product in a retail store's stock inventory, from video frames in which the product is visible. This enables identification of a product visible in a subsequently captured video frame. For brevity, a video frame or part thereof in which a product is visible will be referred to henceforth as an "image". Thus, the deep metric learning module is configured to generate embedding data comprising embedding vectors in response to images in which the product is visible, wherein the embedding vectors are close together (in the embedding space) if the images contain the same product; and far apart, as measured by a similarity or distance function (e.g. dot product similarity or Euclidean distance) if the images contain different products. A query image can then be verified based on similarity or distance thresholding in the embedding space.

Initial Configuration Stage of the Embedding Module 426

In an embodiment, during the initial configuration stage, the Embedding Module 426 is trained to learn one or more embedding vectors $\underline{E}_j$ forming a unique representation of a product $p_i$ contained in a retail store's stock inventory. Accordingly, the initial configuration stage comprises several distinct phases, namely, a training data preparation phase and a network training phase. These phases are successively implemented in a cyclic iterative manner to train the Embedding Module 426. Each of these phases will be described in more detail below.

Training Data Preparation Phase

The dataset used to train the Embedding Module 426 comprises a plurality of video frames in which each of the products from the retail store's stock inventory are visible. The said video frames are captured by video cameras mounted overhead the SCO terminals (not shown) in the retail store (not shown). The video frames, which will henceforth be referred to as the Training Dataset are compiled with the aim of providing robust, class-balanced information about subject products derived from different views of a product obtained with different positioning and orientation of the product(s) relative to the video cameras. The members of the Training Dataset are selected to create sufficient diversity to overcome the challenges to subsequent product recognition posed by variations in illumination conditions, perspective changes and most importantly intra-class variation.

Prior to their use in the Training Dataset, video frames of similar appearance are removed therefrom. Members of the Training Dataset may also be subjected to further data augmentation techniques (such as rotation, flipping, brightness alteration) to increase their diversity and thereby increase the robustness of the trained deep neural network of the Embedding Module 426. Polygonal regions encompassing individual products visible in a video frame are cropped therefrom. The cropped regions are resized to the Processed Product Image Size to produce Cropped Product Images. Individual Cropped Product Images are also provided with a class label identifying the corresponding product.

Model Training Phase:

For brevity, the deep neural network (not shown) in the Embedding Module 426 will be referred to henceforth as an "Embedding Neural Network (ENN)". The ENN comprises a deep neural network (e.g. ResNet, Inception, EfficientNet) in which its final one or more layers (which normally output a classification vector) is replaced with a Linear Normalizing Layer that outputs unit-norm (embedding) vectors of a desired dimension. The dimension is a parameter established when creating the ENN.

During the Model Training Phase, positive and negative pairs of Cropped Product Images are constructed from the Training Dataset. A positive pair comprises two Cropped Product Images with the same class labels and a negative pair comprises two Cropped Product Images with different class labels. For brevity, the resulting Cropped Product Images will be referred to henceforth as "Paired Cropped Images". The Paired Cropped Images are sampled in accordance with a pair mining strategy (e.g. MultiSimilarity or ArcFace as outlined in R. Manmatha, C.-Y. Wu, A. J. Smoia and P. Krähenbuhl, *Sampling Matters in Deep Embedded*

*Learning,* 2017 IEEE International Conference on Computer Vision (CCV2017) Venice, 2017, pp. 2859-2867, doi: 10.1109/ICCV.2017.309). A pair-wise metric learning loss is then calculated from the sampled Paired Video Frames (as described in K. Musgrave, S. Belongie and S.-N. Lim, *A Metric Learning Reality Check,* 2020, https://arxiv.org/abs/2003.08505). The weights of the ENN are then optimized using a backpropagation approach which minimizes the pair wise metric learning loss value.

All of the Paired Cropped Images are processed by the ENN to generate their corresponding embedding vectors. As a result, the embedding vectors are organized in a similar pairwise manner to the Paired Cropped Images. The resulting embedding vectors are stored in the Embedding Database 432. Thus, given an image of each product in a retail store's stock inventory, the trained ENN populates the Embedding Database 432 with an embedding data comprising an embedding vector E computed for each such product. Thus, the Embedding Database 432 comprises a plurality of tuples $(\underline{E}_j, Id_i)$ of the embedding vector and the corresponding identifier $Id_i$ of every product $p_i$ in the retail store's stock inventory.

Run-Time Stage of the Embedding Module 426

For clarity, we define run-time to be normal opening hours of a retail store. During run-time, the ENN (not shown) produces an embedding vector for each product visible in a video frame captured by the video cameras disposed within a pre-defined distance of the SCO terminals (not shown) in the retail store (not shown). Accordingly, the Embedding Module 426 is coupled with the Cropping Module 424 to receive therefrom the Cropped Regions. A Query embedding data comprising an embedding vector generated by the ENN (not shown) in response to a received Cropped Region will be referred to henceforth as a Query Embedding QE. The Embedding Module 426 is communicably coupled with the Expert System Module 430 to transmit thereto the Query Embedding QE.

In an embodiment, the Expert System Module 430 is coupled with the Embedding Module 426 to receive a Query Embedding QE generated by the ENN during the run-time operational stage of the Embedding Module 426.

On receipt of a Query Embedding QE, the Expert System Module 430 interrogates the Embedding Database 432 to retrieve therefrom an embedding vector $\underline{E}_j$. The Expert System Module 430 uses a similarity or distance function (e.g. dot product similarity or Euclidean distance) to compare the Query Embedding QE with the embedding vector $\underline{E}_j$. The Expert System Module 430 uses a similarity or distance function (e.g. dot product similarity or Euclidean distance) to compare a Query Embedding QE with the retrieved embedding vector $\underline{E}_j$.

If the similarity between a Query Embedding QE and a retrieved embedding vector $\underline{E}_j$ exceeds a pre-configured threshold (Th), it is concluded that the Query Embedding QE matches the retrieved embedding vector $\underline{E}_j$. The value of the threshold (Th) parameter is established using a grid search method.

In an embodiment, the process of interrogating the Embedding Database 432 and comparing retrieved embedding vectors $\underline{E}_j$ against the received Query Embedding QE is repeated until a match is found or until all of the embedding vectors $\underline{E}_j$ have been retrieved from the Embedding Database 432. In the event a match is found between a Query Embedding QE and an embedding vector $\underline{E}_j$ from the Embedding Database 432, the matching embedding vector $\underline{E}_j$ will be referred to henceforth as a Matching Embedding ME. The Expert System Module 430 is further adapted to use the Matching Embedding ME to retrieve from the Product Database 434 a product identifier corresponding with the Matching Embedding ME wherein the product identifier is an identifier of the product represented by the Matching Embedding ME. For brevity, this product identifier will be referred to henceforth as the Matching Class Label.

In an embodiment, the Cart Assessment Module 428 is configured to receive a Cart Cropped Region from the Cropping Module 424. The Cart Assessment Module 428 is configured to implement a panoptic segmentation algorithm such as the bidirectional aggregation network (BANet) (as described in Y. Chen, G. Lin, S. Li, O. Bourahla, Y. Wu, F. Wang, J. Feng, M. Xu, X. Li, Banet: Bidirectional aggregation network with occlusion handling for panoptic segmentation, in: Proceedings of the IEEE/CVF Conference on Computer Vision and Pattern Recognition, 2020, pp. 3793-3802), to establish a class label and instance number for each pixel in the Cart Cropped Region.

In an embodiment, the skilled person will acknowledge that the above examples of a panoptic segmentation algorithm is provided for illustration purposes only. In particular, the skilled person will acknowledge that the preferred embodiment is not limited to the above algorithm. On the contrary, the preferred embodiment is operable with any algorithm suited for combined instance segmentation and semantic segmentation of a Cart Cropped Region, such as AuNet (as described in Y. Li, X. Chen, Z. Zhu, L. Xie, G. Huang, D. Du, X. Wang, Attention guided unified network for panoptic segmentation, in: Proceedings of the IEEE/CVF Conference on Computer Vision and Pattern Recognition, 2019, pp. 7026-7035) or the EfficientPS network (as described in R. Mohan and A. Valada, EfficientPS: Efficient Panoptic Segmentation, International Journal of Computer Vision, 2021, 129(5), 1551-1579).

More specifically, the purpose of the panoptic segmentation algorithm is to:

identify a full, partially full or empty shopping cart and products from a retail store's stock inventory in a Cart Cropped Region; and identify all instances of the full, partially full or empty shopping cart and products in the Cart Cropped Region;

identify all products visible in the Cart Cropped Region;

identify all instances of the products identified in the Cart Cropped Region.

The dataset used to train the panoptic algorithm comprises a plurality of video frames in which each of the products from the retail store's stock inventory are visible. The dataset also comprises a plurality of video frames in which shopping carts of varying degrees of fullness are visible. Specifically, the dataset comprises video frames in which empty shopping carts, partially full shopping carts and completely full or overflowing shopping carts are visible. The said video frames are captured by video cameras mounted overhead the SCO terminals (not shown) in the retail store (not shown) and video cameras mounted within a predefined distance of the SCO terminals (not shown). The predefined distance is determined empirically according to the layout of the retail store (not shown), and the intrinsic parameters of video camera(s), so that the Field of View of the video camera(s) embrace an approach region to a SCO terminal (not shown) of the retail store.

The video frames, which will henceforth be referred to as the Training Dataset are compiled with the aim of providing robust, class-balanced information about subject products derived from different views of a product obtained with different positioning and orientation of the product(s) relative to the video cameras. The video frames of the Training Dataset are further compiled to provide robust, class-balanced information about shopping carts of varying degrees of fullness obtained with different positioning and orientation of the shopping cart(s) relative to the video cameras. The members of the Training Dataset are selected to create sufficient diversity to overcome the challenges to subsequent product recognition and shopping cart recognition posed by variations in illumination conditions, perspective changes and most importantly intra-class variation.

Prior to their use in the Training Dataset, video frames of similar appearance are removed therefrom. Members of the Training Dataset may also be subjected to further data augmentation techniques (such as rotation, flipping, brightness alteration) to increase their diversity and thereby increase the robustness of the trained neural networks of the panoptic segmentation algorithm. Polygonal regions encompassing individual shopping carts visible in a video frame are cropped therefrom. The cropped regions are manually resized to the Processed Cart Image Size to Cropped Shopping Cart Images.

The individual pixels of each Cropped Shopping Cart Image of the Training Dataset are manually tagged with class labels identifying the corresponding product or identifying a shopping cart as being empty, partially full or full. The individual pixels are also tagged with instance numbers indicating with which instance of a given class the pixel corresponds. For example, an instance number may indicate if a pixel corresponds with a second tub of ice-cream visible in a video frame or a third pack of toilet rolls visible in the video frame. Members of the Training Dataset are organised in in a pairwise fashion, wherein each data pair comprises a video frame and a corresponding XML file. The XML file contains the class label and instance number of each pixel in the corresponding video frame.

During the training of the neural network model(s) of the panoptic segmentation algorithm, the individual members of the Training Dataset and corresponding entries from the XML file are presented to the neural network model(s) with the aim of building a representation of the large-scale and small-scale features and contextual features sufficient to reproduce the presented members of the Training Dataset and corresponding entries from the XML file.

During run-time, the trained panoptic segmentation algorithm is presented with the Cart Cropped Region received from the Cropping Module 424. The panoptic segmentation algorithm labels each pixel of the Cart Cropped Region corresponding with a region of a shopping cart visible therein, as empty shopping cart, partially full shopping cart or empty shopping cart. In the event multiple shopping carts are present in the Cart Cropped Region, the panoptic segmentation algorithm labels each pixel of the Cart Cropped Region corresponding with a region of a shopping cart visible therein with the instance number of the shopping cart. The panoptic segmentation algorithm labels the pixels of the Cart Cropped Region corresponding with a region of a product visible therein with the class label of the product and the instance number of that product. The output from the Cart Assessment Module 428 comprises the pixels of the Cart Cropped Region and the labels thereof. For brevity, this output will be referred to henceforth as "Cart Related Data".

Figure 7:
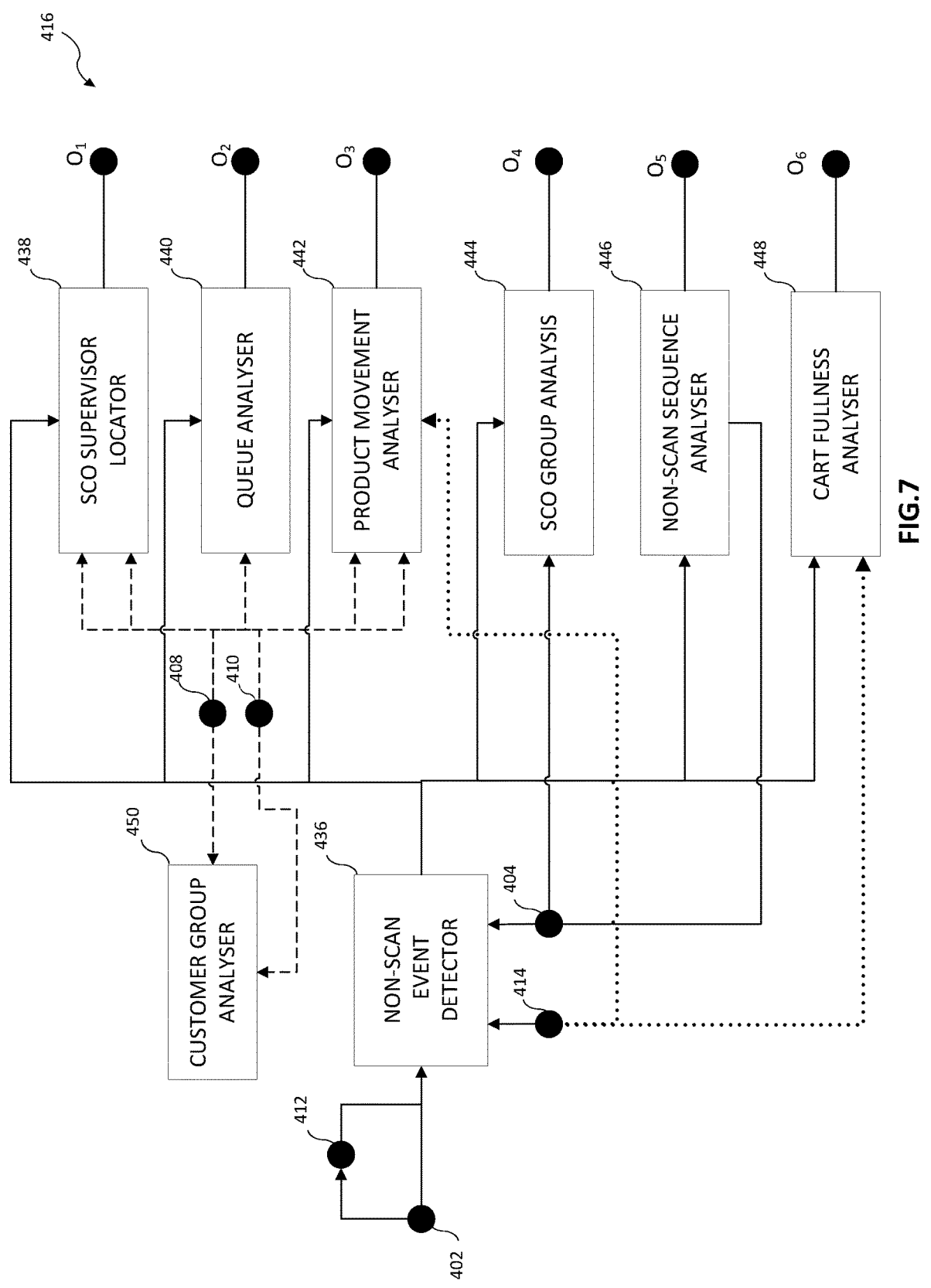
FIG. 7 illustrates a Processing Unit of the Control Unit of the software of FIG. 4 for operating an SCO surface area of a retail store, in accordance with an embodiment of the present disclosure.

FIG. 7 illustrates a Processing Unit 416 of the Control Unit (not shown) of the software of FIG. 4 for operating an SCO surface area of a retail store, in accordance with an embodiment of the present disclosure.

In an embodiment, the Processing Unit 416 comprises a Non-Scan Event Detector 436, a SCO Supervisor Locator Module 438; a Queue Analyser Module 440; a Product Movement Analyser 442; a SCO Group Analysis Module 444; a Non-Scan Sequence Analyser Module 446, Cart Fullness Analyser Module 448; and a Customer Group Analyser Module 450. Each of these and their operations will be described in more detail below.

In an embodiment, the Non-Scan Event Detector 436 is communicably coupled with the Video Unit 402, the SCO Unit 404, the Motion Detection Module 412 and the Object Recognition Module 414. Specifically, the Non-Scan Event Detector 436 is communicably coupled with the Motion Detection Unit 412 to receive a Motion Trigger signal therefrom, indicating that motion was detected within a pre-defined distance of a SCO terminal (not shown), wherein the said pre-defined distance is determined by the intrinsic parameters of video camera(s) (not shown) installed overhead the SCO terminal (not shown) and their installation height to establish the Field of View of the video camera(s) (not shown). The received Motion Trigger signal indicates that a customer has approached the SCO terminal (not shown) and is scanning products at the SCO terminal (not shown).

On receipt of the Motion Trigger signal, the Non-Scan Event Detector 436 is configured to receive successive video frames $Fr(\tau)$ and $Fr(\tau+\Delta t)$ from the Video Unit 402 from video footage captured by from video cameras installed overhead the SCO terminal (not shown). The Non-Scan Event Detector 436 is configured to transmit the successive video frames $Fr(\tau)$ and $Fr(\tau+\Delta t)$ to the Object Recognition Module 414 to detect the presence of a product from the retail store's stock inventory in the video frames. On detecting the presence of a product from the retail store's stock inventory in the received video frames; and recognizing the product, the Object Recognition Module 414 is configured to return a corresponding Matching Class Label to the Non-Scan Event Detector 436. The Matching Class Label is an identifier of the recognized product. More specifically, the Matching Class Label may be the UPC of the recognized product.

On receipt of the Motion Trigger signal, the Non-Scan Event Detector 436 is also configured to receive Sale Till Data from the SCO Unit 404. The received Sale Till Data originates from the SCO terminal (not shown) at which the movement denoted by the Motion Trigger signal was detected. On receipt of the Matching Class Label the Non-Scan Event Detector 436 is configured to compare the Matching Class Label with the Sale Till Data received within a time interval of predefined duration occurring before and after the receipt of the Matching Class Label. The predefined duration is determined empirically to be of sufficient length to enable a match to be found between the Matching Class Label and a member of the Sale Till Data relating to a product scanned at the SCO terminal (not shown) during the time interval, while not delaying the operations of the SCO terminal (not shown).

In the event a match is not found between the received Sale Till Data and the received Matching Class Label, the Non-Scan Event Detector 436 is configured to issue a Non-Scan Alert signal which includes an identifier of the SCO terminal (not shown) at which the movement denoted by the Motion Trigger signal was detected. For brevity, the identifier will be referred to henceforth as Originating SCO Identifier; and a SCO terminal (not shown) corresponding with the Originating SCO Identifier will be referred to henceforth as the "Alert Originating SCO".

In an embodiment, the SCO Supervisor Locator Module 438 is communicably coupled with the Non-Scan Event Detector 436, the Human Classification Module 408 and the Human Tracking Module 410. Specifically, the SCO Supervisor Locator Module 438 is configured to receive a Non-Scan Alert signal from the Non-Scan Event Detector 436. The SCO Supervisor Locator Module 438 is further configured on receipt of the Non-Scan Alert signal to activate the Human Classification Module 408 and the Human Tracking Module 410 to determine the location of every SCO supervisor in the retail store. Using the location information, the SCO Supervisor Locator Module 438 is further configured to calculate the distance between each SCO supervisor and the Alert Originating SCO.

In an embodiment, the SCO Supervisor Locator Module 438 is further configured to detect the presence of adult customers or children within a pre-defined distance of each SCO supervisor. The predefined distance is determined empirically to be an expected maximum distance between a staff member and a customer and/or child in the event the staff member is assisting the customer and/or child.

In the event the SCO Supervisor Locator Module 438 establishes that a SCO supervisor (not shown) is disposed within the pre-defined distance of an adult customer and/or child, the SCO Supervisor Locator Module 438 is configured to activate the Human Tracking Module 410 to track the movements of the SCO supervisor (not shown) and adult customer and/or child for a predefined time interval. The predefined time interval is determined empirically to be an expected minimum duration of an engagement between a staff member and a customer and/or child in the event the SCO supervisor (not shown) is assisting the customer and/or child. The purpose of tracking the movements of the SCO supervisor (not shown) and adult customer and/or child for the predefined time interval is to screen out situations in which the SCO supervisor (not shown) is located close to the adult customer and/or child by chance, rather than active engagement between the SCO supervisor (not shown) and adult customer and/or child.

In the event the SCO Supervisor Locator Module 438 establishes that a SCO supervisor (not shown) is disposed within the pre-defined distance of an adult customer and/or child for a period exceeding the predefined time interval, the SCO Supervisor Locator Module 438 confers the SCO supervisor (not shown) with a "Busy" status tag. On conferring this status tag to the SCO supervisor (not shown), the SCO Supervisor Locator Module 438 may deactivate the tracking of the SCO supervisor (not shown) in question and the nearby adult customer and/or child.

In an embodiment, the SCO Supervisor Locator Module 438 is further configured to activate the Human Tracking Module 410 to track the movements of the remaining SCO supervisors for a predefined time interval. The predefined time interval is determined empirically to be of sufficient duration to determine if a SCO supervisor is moving from one part of the retail store to another, without being of such duration that it excessively delays the operation of the SCO Supervisor Locator Module 438. In the event the SCO Supervisor Locator Module 438 determines that a SCO supervisor (not shown) is moving towards a store-room or a cash room etc., the SCO Supervisor Locator Module 438 confers the SCO supervisor (not shown) with a "Busy" status tag.

In an embodiment, the SCO Supervisor Locator Module 438 is further configured to identify the SCO supervisor (not shown) to whom a "Busy" status tag has not been conferred and who is located closest to the Alert Originating SCO. In the event, the identified SCO supervisor (not shown) is determined to be located less than a predefined distance from the Alert Originating SCO, the SCO Supervisor Locator Module 438 is configured to issue an output signal $O_1$ comprising a "SCO LOCK" signal. Otherwise, the output signal $O_1$ comprises a "VOID" signal.

In an embodiment, the predefined distance from the Alert Originating SCO is determined empirically, according to the layout of the retail store (not shown), to be the maximum distance at which it is practicable for a SCO supervisor to return to a locked SCO terminal (not shown) to determine the cause of the Non-Scan Alert signal and unlock the SCO terminal (not shown) as appropriate.

In an embodiment, the Queue Analyser Module 440 is communicably coupled with the Non-Scan Event Detector 436 and the Human Classification Module 408. Specifically, the SCO Queue Analyser Module 440 is configured to receive a Non-Scan Alert signal from the Non-Scan Event Detector 436. The Queue Analyser Module 440 is further configured on receipt of the Non-Scan Alert signal to activate the Human Classification Module 408 to calculate the number of adult customers and children located within a predefined distance of an approach to the Alert Originating SCO. The Queue Analyser Module 440 is further configured to compare the locations of the adult customers and children located within the predefined distance of the approach to the Alert Originating SCO, to determine whether at least some of the adult customers and children are arranged in a queued pattern at the approach to the Alert Originating SCO.

In the event the Queue Analyser Module 440 determines that at least some of the adult customers and children are arranged in a queued pattern at the approach to the Alert Originating SCO, the Queue Analyser Module 440 is configured to calculate the number of adult customers and children in the queue. In the event the number of adult customers and children in the queue is less than a predefined threshold value, the Queue Analyser Module 440 is configured to issue an output signal $O_2$ comprising a "SCO LOCK" signal. Otherwise, the output signal $O_2$ comprises a "VOID" signal.

The predefined distance from the approach to the Alert Originating SCO and the threshold value on the number of people in a queue at the Alert Originating SCO are determined empirically according to the operators' understanding of likely loss of revenue through customers being deterred by excessively long queues, as balanced against the risk of revenue lost through non-payment for products at the Alert Originating SCO.

In an embodiment, the Product Movement Analyser 442 is communicably coupled with the Non-Scan Event Detector 436, the Human Classification Module 408, the Human Tracking Module 410 and the Object Recognition Module 414. Specifically, the Product Movement Analyser 442 is configured to receive a Non-Scan Alert signal from the Non-Scan Event Detector 436. The Product Movement Analyser 442 is further configured on receipt of the Non-Scan Alert signal to activate the Human Classification Module 408 and Human Tracking Module 410 to receive therefrom the extracted features of the adult customer or child disposed closest to the Alert Originating SCO at a time just after the issuance of the received Non-Scan Alert signal. The Product Movement Analyser 442 is further configured on receipt of the Non-Scan Alert signal to activate the Object Recognition Module 414 to recognize and issue an identifier of a product (not shown) disposed closest to the Alert Originating SCO at a time just after the issuance of the received Non-Scan Alert signal. The Product Movement Analyser 442 is configured to temporarily store the extracted features received from the Human Tracking Module 410 and the product identifier received from the Object Recognition Module 414. The Product Movement Analyser 442 is further configured to reactivate the Object Recognition Module 414 after a predefined time interval to determine the location of the product whose identifier matches the stored product identifier. For brevity, this product will be referred to henceforth as the "Non-Scan Query Product".

In an embodiment, the Product Movement Analyser Module 442 is further configured to reactivate the Human Classification Module 408 and Human Tracking Module 410 to receive therefrom the extracted features of the adult customer or child disposed closest to the Non-Scan Query Product. For brevity, this adult customer or child will be referred to henceforth as the "Non-Scan Query Person". The Product Movement Analyser 442 is further configured to compare the extracted features of the Non-Scan Query Person with the stored extracted features. In the event a match is not found between the extracted features of the Non-Scan Query Person and the stored extracted features, it suggests that the product involved in the non-scan event changed hands and is in the possession of another person. Such movement of a product between persons soon after a non-scan event is suggestive of a deliberate intent by the persons involved in the non-scan event. Accordingly, the Product Movement Analyser 442 is configured to issue an output signal $O_3$ comprising a "SCO LOCK" signal. Otherwise, the output signal $O_3$ comprises a "VOID" signal.

Social engineering of customers at SCO terminals, using nudge theory comprises two main elements, namely, freezing or locking a SCO terminal on detection of a non-scan event and corresponding delay inconvenience to the customer; and interaction of a customer with a SCO supervisor investigating the non-scan event, which may also cause an inconvenience to the customer. Both of these have a deterrent effect on a would-be thief by changing the perceived balance between the risk of detection against the reward from the thievery. But, it also has a cost to the vendor through time spent by the SCO supervisor with the SCO terminal and person involved in the non-scan event, where the time could have been used more effectively elsewhere in the retail store; and lost sales through departures of customers frustrated by delays and long queues at the SCO terminals.

The challenge of managing this balance is amplified in retail stores comprising multiple SCO terminals operating in parallel, because a SCO supervisor can only handle locked SCO-terminal episodes in sequence. Using an analogy from fault management, a locked SCO-terminal episode may be considered a fault in the continuous operation of the SCO-terminal, albeit a deliberately generated fault. Building on this analogy, the disjunction between parallel fault generation and sequential fault resolution becomes particularly acute as the number of sources of such faults increases, for example, the number of SCO-terminals in use during busy periods as compared with quiet periods.

The balance between the two competing objectives of the vendor and the effect of the disjunction between parallel fault generation and sequential fault resolution may be addressed by a three threshold system. A first threshold is based on the number of locked SCO terminals it is practicable for a SCO-supervisor to address in a given period. A second threshold is based on the observation that in many cases a person's frustration with queuing increases according to the duration the person has already spent in a queue. Thus, the second threshold and third threshold addresses the length of time individual SCO-terminals have been locked. These three thresholds can also be indicative of the number of queues at SCO terminals and the length of time the queue has been formed at a given SCO terminal. The values of these three thresholds may be tunable by the vendor according to their risk appetites for loss of revenue arising from theft at a SCO-terminal and their knowledge of their clientele's patience for delays, recognizing potentially different customer patterns and profiles at different times of the day.

Accordingly, the SCO Group Analysis Module 444 is communicably coupled with the Non-Scan Event Detector 436 and the SCO Unit 404. Specifically, the SCO Group Analysis Module 444 is configured to receive a Non-Scan Alert signal from the Non-Scan Event Detector 436. On receipt of the Non-Scan Alert signal, the SCO Group Analysis Module 444 is also configured to receive Status Signals from each SCO terminal (not shown) coupled with the SCO Unit 404. The SCO Group Analysis Module 444 is further configured to calculate from the received Status Signals the number of the SCO terminals that are locked. The SCO Group Analysis Module 444 is further configured to calculate the durations for which each of the locked SCO terminals (not shown) has been locked. For brevity, the SCO terminal (not shown) that has been locked for the longest duration will be referred to as the "Senior Locked SCO Terminal". Similarly, the duration for which the Senior Locked SCO Terminal has been locked will be referred to henceforth as the "Senior Locked Period".

In an embodiment, the SCO Group Analysis Module 444 is further configured to compare the number of locked SCO terminals (not shown) with the first threshold value; and in the event the number of locked SCO terminals (not shown) is less than the first threshold value, the SCO Group Analysis Module 444 is configured to issue an output signal $O_4$ comprising a SCO lock signal. Alternatively, or additionally, the SCO Group Analysis Module 444 is further configured to compare the Senior Locked Period with the second threshold value; and in the event the Senior Locked Period is less than the second threshold value the SCO Group Analysis Module 444 is configured to issue an output signal $O_4$ comprising a SCO lock signal. Alternatively, or additionally, the SCO Group Analysis Module 444 is further configured to calculate the number of SCO terminals (not shown) that have been locked for a duration exceeding the second threshold value; and in the event the number of SCO terminals (not shown) is less than the third threshold value, the SCO Group Analysis Module 444 is configured to issue an output signal $O_4$ comprising a "SCO LOCK" signal. Otherwise, the output signal $O_4$ comprises a "VOID" signal.

In an embodiment, the Non-Scan Sequence Analyser Module 446 is communicably coupled with the Non-Scan Event Detector 436 and the SCO Unit 404. Specifically, the Non-Scan Sequence Analyser Module 446 is configured to receive a Non-Scan Alert signal from the Non-Scan Event Detector 436. On receipt of the Non-Scan Alert signal, the Non-Scan Sequence Analyser Module 446 is configured to store the Originating SCO Identifier and time stamp of the Non-Scan Alert signal. The Non-Scan Sequence Analyser Module 446 is further configured to compare the Originating SCO Identifier of subsequently received Non-Scan Alert signals with the stored Originating SCO Identifier, to identify a match. In the event a match is found, the Non-Scan Sequence Analyser Module 446 is configured to compare the time stamp of the subsequently received Non-Scan Alert signal with the stored time stamp corresponding with the matching stored Originating SCO Identifier. For brevity, the time elapsed between the time stamp of the subsequently received Non-Scan Alert signal and the stored time stamp corresponding with the matching stored Originating SCO Identifier will be referred to henceforth as the "Elapsed Time Since Last Non-Scan Alert". In the event the Elapsed Time Since Last Non-Scan Alert is less than a pre-defined threshold value, the Non-Scan Sequence Analyser Module 446 is configured to issue an output signal $O_5$ comprising a "SCO LOCK" signal. Otherwise, the output signal $O_5$ comprises a "VOID" signal.

In an embodiment, the Cart Fullness Analyser Module 448 is communicably coupled with the Non-Scan Event Detector 436 and the Object Recognition Module 414. Specifically, the Cart Fullness Analyser Module 448 is configured to receive a Non-Scan Alert signal from the Non-Scan Event Detector 436. The Cart Fullness Analyser Module 448 is further configured on receipt of the Non-Scan Alert signal to activate the Object Recognition Module 414 to recognize the presence of a shopping cart beside the Alert Originating SCO. Specifically, the Cart Fullness Analyser Module 448 is configured to receive Cart Related Data from the Cart Assessment Module (not shown) of the Object Recognition Module 414.

In an embodiment, the Cart Related Data comprises the pixels of a region occupied by a shopping cart and the products contained therein visible in a video frame received from a video camera installed overhead the Alert Originating SCO. The Cart Related Data also comprises the class and instance labels for each such pixel. The Cart Fullness Analyser Module 448 is configured to calculate the percentage of the pixels in the Cart Related Data labelled as "full shopping cart", or "partially full shopping cart" or "empty shopping cart". The Cart Fullness Analyser Module 448 is configured to set a Cart Status Variable to a value of "FULL" in the event the majority of the pixels in the Cart Related Data are labelled as "full shopping cart". Similarly, the Cart Fullness Analyser Module 448 is configured to set a Cart Status Variable to a value of "PARTLY FULL" in the event the majority of the pixels in the Cart Related Data are labelled as "partially full shopping cart". Further similarly, the Cart Fullness Analyser Module 448 is configured to set a Cart Status Variable to a value of "EMPTY" in the event the majority of the pixels in the Cart Related Data are labelled as "empty shopping cart".

In the event the Cart Status Variable is set to a value of "FULL", the Cart Fullness Analyser Module 448 is configured to count the number of instances of each visible product contained in the shopping cart. In the event the number of instances of a visible product contained in the shopping cart exceeds a pre-defined threshold value, the Cart Fullness Analyser Module 448 is configured to append the label "BULK LOADED" to the Cart Status Variable.

The pre-defined threshold value is determined empirically according to insights, experience and historical knowledge of the operators as regards situations in which thieves may attempt to conceal their theft of a product by placing it in a shopping cart filled with other products, especially if the other products are essentially identical.

In an embodiment, the Cart Fullness Analyser Module 448 is further configured to count the number of pixels in the Cart Related Data labelled with the same product class label and instance number. The counted number of pixels provides an initial rough estimate of the visible area of the corresponding product. For brevity, the product whose single instance forms the majority of the number of pixels in the Cart Related Data that are not labelled as "full shopping cart", or "partially full shopping cart" or "empty shopping cart", will be referred to henceforth as the "Largest Visible Product".

In an embodiment, the Cart Fullness Analyser Module 448 is communicably coupled with a Product Details Database (not shown). The Product Details Database (not shown) includes the details of the volume of each product in the retail store's stock inventory. The Cart Fullness Analyser Module 448 is configured to interrogate the Product Details Database (not shown) to retrieve a record corresponding with the Largest Visible Product. Thus, the retrieved record details the volume of the largest visible object contained in the shopping cart disposed beside the Alert Originating SCO. For brevity, this volume will be referred to henceforth as the "Largest Volume Instance". In the event, the Largest Volume Instance exceeds a predefined threshold value, the Cart Fullness Analyser Module 448 is configured to append the label "LARGE ITEM" to the Cart Status Variable. The pre-defined threshold value is determined empirically according to insights, experience and historical knowledge of the operators as regards the normal range of sizes of items sold in the retail store. The Cart Fullness Analyser Module 448 is configured to issue an output signal $O_6$ comprising the Cart Status Variable.

FIG. 8 illustrates a table of outputs from the Processing Unit of the Control Unit of the software of FIG. 4 for operating an SCO surface area of a retail store, in accordance with an embodiment of the present disclosure Accordingly, the Processing Unit 416 of the Control Unit 406 is configured to transmit a Processed Output Signal comprising $O_1$, $O_2$, $O_3$, $O_4$, $O_5$ and $O_6$ as set out in the table in FIG. 8 to the Logic Unit 418 of FIG. 4.

Returning to FIG. 4, the Logic Unit 418 of the Control Unit 406 is configured to receive a Processed Output Signal from the Processing Unit 416 of the Control Unit 406. The Logic Unit 418 comprises several Boolean logic units (not shown) operable to review the contents of one or more of the $O_1$, $O_2$, $O_3$, $O_4$, $O_5$ and $O_6$ components of the Processed Output Signal; and to issue SCO locking instruction together with the Originating SCO Identifier of the SCO terminal (not shown) at which a non-scan event was detected. For brevity, the SCO locking instruction and the Originating SCO Identifier are collectively known as a "SCO locking control signal".

The Boolean logic units (not shown) may be configured according to the requirements of the operators. However, in one example, the Boolean logic units (not shown) are configured to cause the Logic Unit 418 to issue a SCO locking control signal to the SCO Unit 404 in the event any one of the $O_1$, $O_2$, $O_3$, $O_4$ and $O_5$ components of the Processed Output Signal has a value "SCO LOCK", the. Similarly, in another example, the Boolean logic units (not shown) are configured to cause the Logic Unit 418 to issue a SCO locking control signal to the SCO Unit 404 in the event the $O_6$ component of the Processed Output Signal has a value of "FULL" or "FULL-BULK LOADED".

The skilled person will acknowledge that the above examples of the configurations of the Boolean logic units (not shown) are provided for illustration purposes only. In particular, the skilled person will acknowledge that the software of the preferred embodiment is not limited to the above examples of the configurations of the Boolean logic units (not shown). On the contrary, the software of the preferred embodiment is operable with any configuration of the Boolean logic units (not shown) suitable for processing one or more of the components of the Processed Output Signal received from the Processing Unit 416 of the Control Unit 406.

In an embodiment, the SCO unit 404 is configured to receive a SCO locking control signal from the Logic Unit

418 of the Control Unit 406 to cause the locking of the SCO terminal $SCO_1$ to $SCO_n$ in the retail store denoted by the Originating SCO Identifier of the SCO locking control signal.

Referring to FIG. 9, which illustrates a method 900 of operating one or more one or more SCO terminals of a SCO environment. The method comprises a first step 902 of capturing a plurality of video frames using one or more video sensors installed in a pre-defined location from the one or more SCO terminals $SCO_1$ to $SCO_n$. The video sensors comprises one or more video cameras $C_1$ to $C_n$ installed over one or more SCO terminals $SCO_1$ to $SCO_n$, or at a pre-defined distance from the SCO terminals $SCO_1$ to $SCO_n$.

In an embodiment, the method 900 comprises a next step 904 of obtaining status data of each of the SCO terminals $SCO_1$ to $SCO_n$. The status data comprises an indicator of whether a SCO terminal $SCO_1$ to $SCO_n$ is locked or active. The Status Signal may further comprise a time stamp of when a SCO terminal $SCO_1$ to $SCO_n$ is locked.

In an embodiment, the method 900 comprises a next step 906 of coupling a control unit to the one or more video sensors and the SCO unit. The control unit 406 includes a processing unit, and a memory. The processing unit includes a processor, computer, microcontroller, or other circuitry that controls the operations of various components such as the memory. The processing unit may execute software, firmware, and/or other instructions, for example, that are stored on a volatile or non-volatile memory, such as the memory, or otherwise The processing unit may be connected to the memory, through wired or wireless connections, such as one or more system buses, cables, or other interfaces.

In an embodiment, the method 900 comprises a next step 908 of determining one or more frames of interest from the plurality of video frames using a machine learning model. In the same embodiment, the determination of the one or more frames comprises detecting a primary subject of interest using a human classification module 408. In the same embodiment, the detected primary subject of interest is classified based on an age group, i.e., a child, or an adult. In the same embodiment, the method comprises detecting one or more secondary subject of interest, post the detection of the primary subject of interest.

In an embodiment, the method 900 comprises a next step 910 of determining location and time of detection of the primary subject of interest and the secondary subject of interest within a pre-defined distance from the one or more SCO terminals $SCO_1$ to $SCO_n$ using a human tracking module 410.

In an embodiment, the method 900 comprises a next step 912 generating a motion trigger based on detection of change in the location of the primary subject of interest and the secondary subject of interest within the pre-defined distance of any one of the SCO terminal $SCO_1$ to $SCO_n$ using a motion detection unit 412.

In an embodiment, based on the generated motion trigger, the method 900 comprises a next step 914 of receiving a transaction data from the SCO unit 404, wherein the transaction data comprises transactions received by scanning the one or more secondary subject of interest at any one of the SCO terminal $SCO_1$ to $SCO_n$.

In an embodiment, the method 900 comprises a next step 916 of comparing the transaction data from the SCO unit 404 with the detected secondary subject of interest. Further, the method 900 comprises a next step 918 of generating a non-scan event alert based on a mismatch in the comparison of the transaction data and the detected one or more secondary subject of interest.

Modifications to embodiments of the present disclosure described in the foregoing are possible without departing from the scope of the present disclosure as defined by the accompanying claims. Expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. A method of operating a plurality of self-checkout (SCO) terminals of a SCO environment, the method comprising:

receiving, by a control unit, a plurality of video frames captured using one or more video sensors installed in a pre-defined location from each of the plurality of SCO terminals;

obtaining, by the control unit, status data of each of the plurality of SCO terminals using an SCO unit communicably coupled to each of the plurality of SCO terminals, wherein the status data identifies each of the plurality of SCO terminals as one of a locked or an active, wherein the control unit is communicably coupled to the one or more video sensors and the SCO unit, wherein the control unit comprises a processing unit connected to a memory, wherein the memory comprises a set of instructions executed by the processing unit for:

determining one or more frames of interest from the plurality of video frames using a machine learning model, wherein the determination of the one or more frames of interest comprises:

detecting a primary subject of interest using a human classification module, wherein the human classification module is trained based on training data determined based on the plurality of video frames captured using the one or more video sensors;

classifying the detected primary subject of interest based on an age group of the primary subject of interest;

detecting one or more secondary subject of interest using an object detection module, post the detection of the primary subject of interest within a pre-defined distance from each of the plurality of SCO terminals;

determining location and time of detection of the primary subject of interest and the secondary subject of interest;

generating a motion trigger based on detection of change in the location of the primary subject of interest and the secondary subject of interest within the pre-defined distance of one of the plurality of SCO terminals using a motion detection unit; and based on the generated motion trigger:

receiving transaction data from the SCO unit, wherein the transaction data comprises transactions received by scanning one or more objects at the respective one of the plurality of SCO terminals;

comparing the transaction data from the SCO unit with the detected one or more secondary subject of interest;

generating a non-scan event alert based on a mismatch in the comparison of the transaction data and the detected one or more secondary subject of interest; and initiating a terminal lockdown procedure by identifying a predefined threshold of concurrently locked terminals and, in response to the processing unit determining that a number of concurrently locked terminal is less than said threshold, the processing unit generating an SCO LOCK signal, and sending said SCO LOCK signal to the specific SCO unit of the SCO terminal that is to be locked, and thereby interrupting continuous operation of the SCO terminal coupled to the SCO unit.

2. The method of claim 1, wherein the classification of the detected primary subject of interest based on the age group of the primary subject of interest comprises classifying the primary subject of interest as a SCO supervisor, a child, or an adult; and wherein the secondary subject of interest is associated with the detected primary subject of interest, and wherein the secondary subject of interest comprises a shopping trolley, or stacked goods.

3. The method of claim 1 further comprising:

identifying physical features of the primary subject of interest in one video frame of the plurality of video frames using a human tracking module;

forming, by the human tracking module, a person identification data based on the identified physical features of the primary subject of interest;

linking, by the human tracking module, a biometric signature of the primary subject of interest with the person identification data; and storing, by the human tracking module, the person identification data in an internal repository of the human tracking module.

4. The method of claim 3 further comprising:

forming, by the human tracking module, a query identification data of the primary subject of interest in a successive frame of the plurality of video frames;

comparing, by the human tracking module, the query identification data of the primary subject of interest with the stored person identification data in the internal repository; and based on the comparison:

assigning, by the human tracking module, a new person identification data to the primary subject of interest in another video frame, when the query identification data fails to match with the person identification data.

5. The method of claim 1 further comprising:

detecting, using an object recognition module, an object as the secondary subject of interest; and forming, by the object recognition module, an object detection data associated with the detected object; and processing, using a cropping module, the plurality of video frames based on the object detection data to crop a region in the plurality of video frames to form a product cropped region.

6. The method of claim 5, wherein the cropping module is further connected to an embedding unit, wherein the embedding unit is configured for:

forming an embedding data of the object present in an inventory of the SCO environment;

receiving the product cropped region;

creating a query embedding data in response to the received product cropped region; and comparing the query embedding data and the embedding data; and determining a match of the query embedding data with the embedding data if a similarity between the query embedding data with the embedding data exceeds a pre-defined threshold.

7. The method of claim 1, wherein the control unit further comprises an SCO supervisor locator module configured for:

receiving the non-scan event alert;

determining a distance of an SCO supervisor within the pre-defined distance from the SCO terminal for which the non-scan event alert is generated; and locking the SCO terminal when the distance of the SCO supervisor is greater than the pre-defined distance for a pre-defined time interval.

8. A system for operating a plurality of self-checkout (SCO) terminals of a SCO environment, the system comprising:

one or more video sensors installed in a pre-defined location from each of the plurality of SCO terminals configured to capture a plurality of video frames;

an SCO unit communicably coupled to each of the plurality of SCO terminals and configured to obtain status data of each of the plurality of SCO terminals, wherein the status data identifies each of the plurality of SCO terminals as one of a locked or an active;

a control unit coupled to the one or more video sensors and the SCO unit, wherein the control unit comprises a processing unit connected to a memory, wherein the memory comprises a set of instructions executed by the processing unit configured to:

determine one or more frames of interest from the plurality of video frames using a machine learning model, wherein the determination of the one or more frames of interest comprises:

detect a primary subject of interest using a human classification module, wherein the human classification module is trained based on training data determined based on the plurality of video frames captured using the one or more video sensors;

classify the detected primary subject of interest based on an age group of the primary subject of interest; and detect one or more secondary subject of interest using an object detection module, post appearance of the primary subject of interest within a pre-defined distance from each of the plurality of SCO terminals;

determine location and time of appearance of the primary subject of interest and the secondary subject of interest;

generate a motion trigger based on detection of change in location data of the primary subject of interest and the secondary subject of interest within the pre-defined distance of one of the plurality of SCO terminals, using a motion detection unit;

based on the generated motion trigger:

receive transaction data from the SCO unit, wherein the transaction data comprises transactions received by scanning one or more objects at the respective one of the plurality of SCO terminals;

compare the transaction data from the SCO unit with the detected secondary subject of interest using a non-scan event detector;

generate a non-scan event alert based on a mismatch in the comparison of the transaction data and the detected one or more secondary subject of interest;

the processing unit further configured to initiate a terminal lockdown procedure by identifying a pre-defined threshold of concurrently locked terminals and, in response to the processing unit determining that a number of concurrently locked terminal is less than said threshold, the processing unit generating an SCO LOCK signal, and sending said SCO LOCK signal to the specific SCO unit of the SCO terminal that is to be locked, and thereby interrupting continuous operation of the SCO terminal coupled to the SCO unit.

9. The system of claim 8, wherein the classification of the detected primary subject of interest based on the age group of the primary subject of interest comprises classifying the primary subject of interest as a SCO supervisor, a child, or an adult; and wherein the secondary subject of interest is associated with the detected primary subject of interest, and wherein the secondary subject of interest comprises any one of a shopping trolley, or stacked goods.

10. The system of claim 8 further comprising a human tracking module configured to:

identify physical features of the primary subject of interest in one video frame of the plurality of video frames;

form a person identification data based on the identified physical features of the primary subject of interest;

link a biometric signature of a primary subject of interest with the person identification data; and store the person identification data in an internal repository of the human tracking module.

11. The system of claim 10, wherein the human tracking module is further configured to:

form a query identification data of the primary subject of interest in a successive frame of the plurality of video frames;

compare the query identification data of the primary subject of interest with stored person identification data in an internal repository; and based on the comparison:

assign a new person identification data to the primary subject of interest in another video frame, when the query identification data fails to match with the person identification data.

12. The system of claim 8 further comprising:

an object recognition module configured to:

detect an object as the secondary subject of interest; and form an object detection data associated with the detected object; and a cropping module configured to:

process the plurality of video frames based on the object detection data to crop a region in the plurality of video frames to form a product cropped region.

13. The system of claim 12, wherein the cropping module is further connected to an embedding unit, wherein the embedding unit is configured to:

form an embedding data of the object present in an inventory of the SCO environment;

receive the product cropped region;

create a query embedding data in response to the received product cropped region; and compare the query embedding data and the embedding data; and determine a match of the query embedding data with the embedding data if a similarity between the query embedding data with the embedding data exceeds a pre-defined threshold.

14. The system of claim 8, wherein the control unit further comprises an SCO supervisor locator module configured to:

receive the non-scan event alert;

determine a distance of an SCO supervisor within the pre-defined distance from the SCO terminal for which the non-scan event alert is generated; and

lock the SCO terminal when the distance of the SCO supervisor is greater than the pre-defined distance for a pre-defined time interval.

15. A non-transitory computer-readable medium having stored thereon a set of instructions which when executed by a computer causes the computer to perform operations for operating a plurality of self-checkout (SCO) terminals of an SCO environment, comprising:

receiving a plurality of video frames captured using one or more video sensors installed in a pre-defined location from each of the plurality of SCO terminals;

obtaining status data of each of the plurality of SCO terminals using an SCO unit communicably coupled to each of the plurality of SCO terminals, wherein the status data identifies each of the plurality of SCO terminals as one of a locked or an active, wherein a control unit is communicably coupled to the one or more video sensors and the SCO unit, wherein the control unit comprises a processing unit connected to a memory, wherein the memory comprises a set of instructions executed by the processing unit for:

determining one or more frames of interest from the plurality of video frames using a machine learning model, wherein the determination of the one or more frames of interest comprises:

detecting a primary subject of interest using a human classification module, wherein the human classification module is trained based on training data determined based on the plurality of video frames captured using the one or more video sensors;

classifying the detected primary subject of interest based on an age group of the primary subject of interest;

detecting one or more secondary subject of interest using an object detection module, post the detection of the primary subject of interest and within a pre-defined distance from each of the plurality of SCO terminals;

determining location and time of detection of the primary subject of interest and the secondary subject of interest;

generating a motion trigger based on detection of change in the location of the primary subject of interest and the secondary subject of interest within the pre-defined distance of one of the plurality of SCO terminals using a motion detection unit; and based on the generated motion trigger:

receiving transaction data from the SCO unit, wherein the transaction data comprises transactions received by scanning one or more objects at the respective one of the plurality of SCO terminals;

comparing the transaction data from the SCO unit with the detected one or more secondary subject of interest;

generating a non-scan event alert based on a mismatch in the comparison of the transaction data and the detected one or more secondary subject of interest; and the processing unit further configured to initiate a terminal lockdown procedure by identifying a pre-defined threshold of concurrently locked terminals and, in response to the processing unit determining that a number of concurrently locked terminal is less than said threshold, the processing unit generating an SCO LOCK signal, and sending said SCO LOCK signal to the specific SCO unit of the SCO terminal that is to be locked, and thereby interrupting continuous operation of the SCO terminal coupled to the SCO unit.

16. The non-transitory computer-readable medium of claim 15 further comprising:

identifying, using a human tracking module, physical features of the primary subject of interest in one video frame of the plurality of video frames;

forming, by the human tracking module, a person identification data based on the identified physical features of the primary subject of interest;

linking, by the human tracking module, a biometric signature of the primary subject of interest with the person identification data; and storing, by the human tracking module, the person identification data in an internal repository of the human tracking module.

17. The non-transitory computer-readable medium of claim 16, wherein the human tracking module is further configured for:

forming a query identification data of the primary subject of interest in a successive frame of the plurality of video frames;

comparing the query identification data of the primary subject of interest with the stored person identification data in the internal repository; and based on the comparison:

assigning a new person identification data to the primary subject of interest in another video frame, when the query identification data fails to match with the person identification data.

18. The non-transitory computer-readable medium of claim 15, wherein:

an object recognition module is configured for:

detecting an object as the secondary subject of interest; and forming an object detection data associated with the detected object; and a cropping module is configured for:

processing the plurality of video frames based on the object detection data to crop a region in the plurality of video frames to form a product cropped region.

19. The non-transitory computer-readable medium of claim 18, wherein the cropping module is further connected to an embedding unit, wherein the embedding unit is configured for:

forming an embedding data of the object present in an inventory of the SCO environment;

receiving the product cropped region;

creating a query embedding data in response to the received product cropped region; and comparing the query embedding data and the embedding data; and determining a match of the query embedding data with the embedding data if a similarity between the query embedding data with the embedding data exceeds a pre-defined threshold.

20. The non-transitory computer-readable medium of claim 15, wherein the control unit further comprises an SCO supervisor locator module configured for:

receiving the non-scan event alert;

determining a distance of an SCO supervisor within a pre-defined distance from the SCO terminal for which the non-scan event alert is generated; and locking the SCO terminal when the distance of the SCO supervisor is greater than the pre-defined distance for a pre-defined time interval.

\* \* \* \* \*